United States Patent
Liu et al.

(10) Patent No.: US 12,212,513 B2
(45) Date of Patent: Jan. 28, 2025

(54) MULTIPLEXING SIDELINK SYNCHRONIZATION SIGNAL BLOCKS AND CHANNEL STATE INFORMATION REFERENCE SIGNALS

(71) Applicant: QUALCOMM INCORPORATED, San Diego, CA (US)

(72) Inventors: Chih-Hao Liu, San Diego, CA (US); Jing Sun, San Diego, CA (US); Yisheng Xue, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 638 days.

(21) Appl. No.: 17/452,979

(22) Filed: Oct. 29, 2021

(65) Prior Publication Data

US 2023/0135581 A1 May 4, 2023

(51) Int. Cl.
*H04L 5/00* (2006.01)
*H04W 72/0446* (2023.01)
*H04W 72/20* (2023.01)

(52) U.S. Cl.
CPC ....... *H04L 5/0048* (2013.01); *H04W 72/0446* (2013.01); *H04W 72/20* (2023.01)

(58) Field of Classification Search
CPC ... H04L 5/0048; H04L 5/0062; H04L 5/0073; H04L 5/0091; H04W 72/0446; H04W 72/20
See application file for complete search history.

(56) References Cited

U.S. PATENT DOCUMENTS

| | | | |
|---|---|---|---|
| 2020/0053781 A1* | 2/2020 | Pan | H04W 72/30 |
| 2021/0091901 A1 | 3/2021 | Sun et al. | |
| 2021/0266126 A1 | 8/2021 | Sun et al. | |
| 2022/0399917 A1* | 12/2022 | Shin | H04B 17/318 |

FOREIGN PATENT DOCUMENTS

WO    WO-2022188508 A1 *  9/2022

OTHER PUBLICATIONS

Machine translation and original—WO 2022188508 (Year: 2021).*
International Search Report and Written Opinion—PCT/US2022/045480—ISA/EPO—Jan. 19, 2023.

* cited by examiner

*Primary Examiner* — Rina C Pancholi

(57) ABSTRACT

Wireless communications systems and methods related to communicating control information are provided. A method of wireless communication performed by a first sidelink user equipment (UE) may include transmitting, to a second sidelink UE, at least one channel state information reference signal (CSI-RS) in a slot and transmitting, to the second sidelink UE, at least one sidelink synchronization signal block (S-SSB) in the slot, wherein an occupied channel bandwidth (OCB) associated with the slot satisfies a threshold based at least on the transmitting the at least one CSI-RS and the transmitting the at least one S-SSB.

30 Claims, 10 Drawing Sheets

1000

Receive, by a first sidelink UE from a second sidelink UE in a first slot, at least one channel state information reference signal (CSI-RS) in a slot;                    1010

Receive, from the second sidelink UE, at least one sidelink synchronization signal block (S-SSB) in the slot, wherein an occupied channel bandwidth (OCB) associated with the slot satisfies a threshold based at least on the receiving the at least one CSI-RS and the receiving the at least one S-SSB                 1020

MULTIPLEXING SIDELINK SYNCHRONIZATION SIGNAL BLOCKS AND CHANNEL STATE INFORMATION REFERENCE SIGNALS

TECHNICAL FIELD

This application relates to wireless communication systems, and more particularly, to multiplexing a sidelink-synchronization signal block (S-SSB) transmission with a channel state information reference signal (CSI-RS) transmission in a shared radio frequency band.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a first sidelink user equipment (UE) may include transmitting, to a second sidelink UE, at least one channel state information reference signal (CSI-RS) in a sidelink synchronization signal block (S-SSB) slot, wherein an occupied channel bandwidth (OCB) associated with the S-SSB slot satisfies a threshold based at least on the transmitting the at least one CSI-RS in the S-SSB slot.

In an additional aspect of the disclosure, a method of wireless communication performed by a first sidelink user equipment (UE) may include receiving, from a second sidelink UE, at least one channel state information reference signal (CSI-RS) in a sidelink synchronization signal block (S-SSB) slot, wherein an occupied channel bandwidth (OCB) associated with the S-SSB slot satisfies a threshold based at least on the receiving the at least one CSI-RS in the S-SSB slot.

In an additional aspect of the disclosure, a first sidelink user equipment (UE) may include a memory; a transceiver; and at least one processor coupled to the memory and the transceiver, wherein the first sidelink UE is configured to transmit, to a second sidelink UE, at least one channel state information reference signal (CSI-RS) in a sidelink synchronization signal block (S-SSB) slot, wherein an occupied channel bandwidth (OCB) associated with the S-SSB slot satisfies a threshold based at least on the transmitting the at least one CSI-RS in the S-SSB slot.

In an additional aspect of the disclosure, a first sidelink user equipment (UE) may include a memory; a transceiver; and at least one processor coupled to the memory and the transceiver, wherein the first sidelink UE is configured to receive, from a second sidelink UE, at least one channel state information reference signal (CSI-RS) in a sidelink synchronization signal block (S-SSB) slot, wherein an occupied channel bandwidth (OCB) associated with the S-SSB slot satisfies a threshold based at least on the receiving the at least one CSI-RS in the S-SSB slot.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

DETAILED DESCRIPTION

Figure 1:
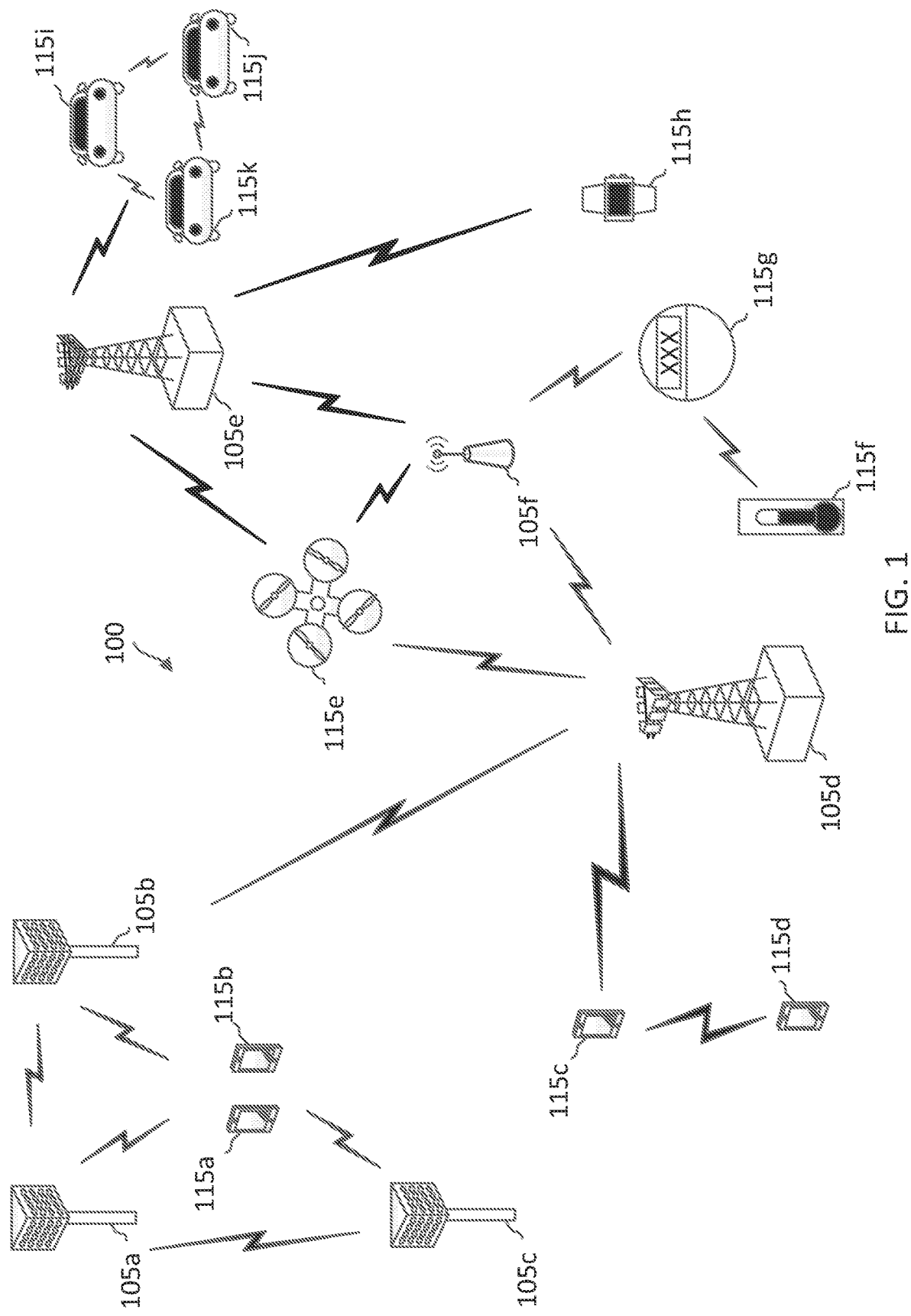
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The deployment of NR over an unlicensed spectrum is referred to as NR-unlicensed (NR-U). Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. Additionally, NR-U can also be deployed over 2.4 GHz unlicensed bands, which are currently shared by various radio access technologies (RATs), such as IEEE 802.11 wireless local area network (WLAN) or WiFi and/or license assisted access (LAA). Sidelink communications may benefit from utilizing the additional bandwidth available in an unlicensed spectrum. However, channel access in a certain unlicensed spectrum may be regulated by authorities. For instance, some unlicensed bands may impose restrictions on the power spectral density (PSD) and/or minimum occupied channel bandwidth (OCB) for transmissions in the unlicensed bands. For example, the unlicensed national information infrastructure (UNII) radio band has a minimum OCB requirement of about 70 percent (%).

Some sidelink systems may operate over a 20 MHz bandwidth in an unlicensed band. A BS may configure a sidelink resource pool over the 20 MHz band for sidelink communications. A sidelink resource pool is typically partitioned into multiple frequency subchannels or frequency subbands (e.g., about 5 MHz each) and a sidelink UE may select a sidelink resource (e.g., a subchannel) from the sidelink resource pool for sidelink communication. To satisfy an OCB of about 70%, a sidelink resource pool may utilize a frequency-interlaced structure. For instance, a frequency-interlaced-based sidelink resource pools may include a plurality of frequency interlaces over the 20 MHz band, where each frequency interlace may include a plurality of resource blocks (RBs) distributed over the 20 MHz band. For example, the plurality of RBs of a frequency interlace may be spaced apart from each other by one or more other RBs in the 20 MHz unlicensed band. A sidelink UE may select a sidelink resource in the form of frequency interlaces from the sidelink resource pool for sidelink communication. In other words, sidelink transmissions may utilize a frequency-interlaced waveform to satisfy an OCB of the unlicensed band. However, S-SSBs may be transmitted in a set of contiguous RBs, for example, in about eleven contiguous RBs. As such, S-SSB transmissions alone may not meet the OCB requirement of the unlicensed band. Accordingly, it may be desirable for a sidelink sync UE to multiplex an S-SSB transmission with one or more channel state information reference signals (CSI-RSs) in a slot configured for S-SSB transmission so that the sidelink sync UE's transmission in the slot may comply with an OCB requirement.

The present application describes mechanisms for a sidelink UE to multiplex an S-SSB transmission with a CSI-RS transmission in a frequency band to satisfy an OCB of the frequency band. For instance, the sidelink UE may determine a multiplex configuration for multiplexing a CSI-RS transmission with an S-SSB transmission in a sidelink BWP. The sidelink UE may transmit the S-SSB transmission in the sidelink BWP during a sidelink slot. The sidelink UE may transmit one or more CSI-RSs in the sidelink BWP during the sidelink slot by multiplexing the CSI-RS and the S-SSB transmission based on the multiplex configuration.

In some aspects, the sidelink UE may transmit the S-SSB transmission at an offset from a lowest frequency of the sidelink BWP based on a synchronization raster (e.g., an NR-U sync raster). In some aspects, the sidelink UE may transmit the S-SSB transmission aligned to a lowest frequency of the sidelink BWP. For instance, a sync raster can be defined for sidelink such that the S-SSB transmission may be aligned to a lowest frequency of the sidelink BWP.

In some aspects, the multiplex configuration includes a configuration for multiplexing the S-SSB transmission with a frequency interlaced waveform sidelink transmission to meet the OCB requirement. For instance, the sidelink transmission may include a CSI-RS transmission multiplexed in frequency within a frequency interlace with RBs spaced apart in the sidelink BWP. In some instances, the sidelink UE may rate-match the CSI-RS transmission around RBs that are at least partially overlapping with the S-SSB transmission.

In some aspects, the multiplex configuration includes a configuration for multiplexing the S-SSB transmission with a subchannel-based sidelink transmission to meet the OCB requirement. For instance, the sidelink transmission may include a CSI-RS transmission multiplexed in time within a subchannel including contiguous RBs in the sidelink BWP. For instance, the S-SSB transmission may be transmitted at a low frequency portion of the sidelink BWP, and the CSI-RS may be transmitted in a subchannel located at a high frequency portion of the sidelink BWP to meet the OCB.

In some aspects, a BS may configure different sidelink resource pools for slots that are associated with S-SSB transmissions and for slots that are not associated with S-SSB transmissions. For instance, the BS may configure a first resource pool with a frequency-interlaced structure for slots that are not configured for S-SSB transmissions. The first resource pool may include a plurality of frequency interlaces (e.g., distributed RBs), where each frequency interlace may carry a PSCCH/PSSCH transmission. The BS may configure a second resource pool with a subchannel-based structure for slots that are configured for S-SSB transmission. The second resource pool may include a plurality of frequency subchannels (e.g., contiguous RBs), where each subchannel may carry a PSCCH/PSSCH transmission. To satisfy an OCB in a sidelink slot configured for an S-SSB transmission, the sidelink UE (e.g., a sidelink sync UE) may transmit an S-SSB transmission multiplexed with a CSI-RS transmission. For instance, the S-SSB transmission may be transmitted in frequency resources located at a lower frequency portion of a sidelink BWP and the CSI-RS transmission may be transmitted in frequency resources located at higher frequency portion of the sidelink BWP.

Aspects of the present disclosure may provide several benefits. For example, multiplexing an S-SSB transmission with a CSI-RS transmission by a sidelink UE (e.g., a sidelink sync UE) may allow the sidelink UE's transmission to meet an OCB requirement. Utilizing a frequency-interlaced waveform CSI-RS transmission for multiplexing with the S-SSB transmission may meet the OCB requirement. Utilizing a subchannel-based CSI-RS transmission for multiplexing with the S-SSB transmission may provide a better compatibility with the S-SSB transmission since the subchannel may be selected at a higher frequency location to satisfy the OCB requirement and without overlapping with the S-SSB transmission.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a vehicle (e.g., a car, a truck, a bus, an autonomous vehicle, an aircraft, a boat, etc.). Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some aspects, to satisfy an OCB when operating over an unlicensed band, CSI-RS transmissions may be multiplexed in time and/or frequency with S-SSB transmissions. To satisfy an OCB in a sidelink slot configured for an S-SSB transmission, a sidelink sync UE 115 may transmit an S-SSB transmission multiplexed with a CSI-RS transmission. The S-SSB and CSI-RS transmissions may be multiplexed in adjacent frequencies and/or in a frequency interlaced waveform. In some aspects, the BS 105 may configure sidelink resource pools for slots that are associated with S-SSB transmission. For instance, the BS 105 may configure a resource pool with a frequency interlace-structure for slots that are configured for S-SSB transmissions. The resource pool may include a plurality of frequency interlaces (e.g., distributed RBs), where each frequency interlace may carry a CSI-RS transmission. Additionally or alternatively, the BS 105 may configure the resource pool with a subchannel-based structure for slots that are configured for S-SSB transmission. The resource pool may include a plurality of frequency subchannels (e.g., contiguous RBs), where each subchannel may carry one or more CSI-RS transmissions. The S-SSB transmission may be transmitted in frequency resources located at a lower frequency portion of a sidelink BWP and the CSI-RS transmission may be transmitted in frequency resources located at higher frequency portion of the sidelink BWP. Mechanisms for multiplexing an S-SSB transmission with one or more CSI-RS transmissions to satisfy an OCB are discussed in greater detail herein.

Figure 2:
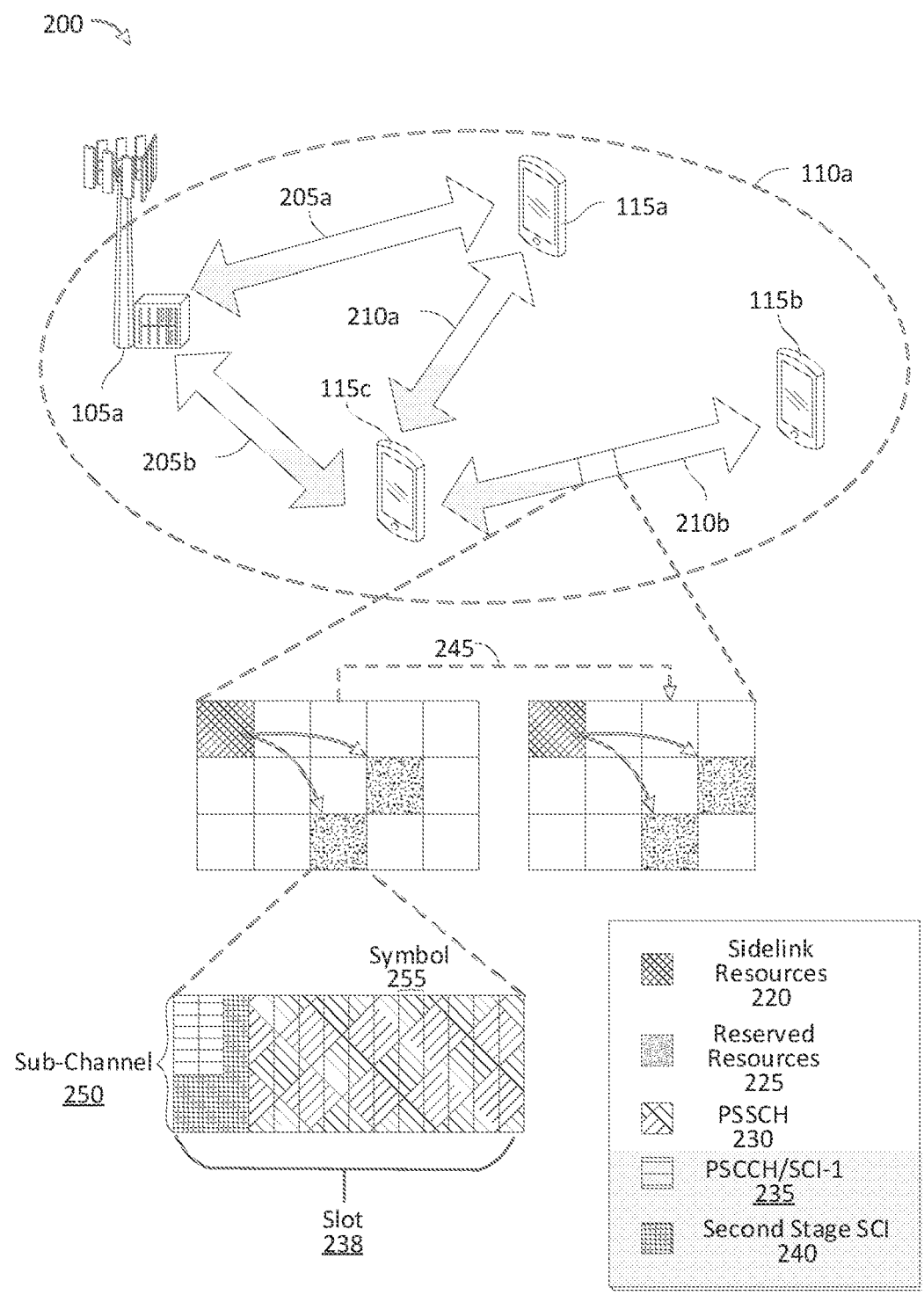
FIG. 2 illustrates a sidelink wireless communication network according to some aspects of the present disclosure.

FIG. 2 illustrates sidelink resources associated with a wireless communication network 200 according to some aspects of the present disclosure. The wireless communications network 200 may include a base station 105a and UEs 115a, 115b, and 115c, which may be examples of a BS 105 and a UE 115 as described with reference to FIG. 1. Base station 105a and UEs 115a and 115c may communicate within geographic coverage area 110a and via communication links 205a and 205b, respectively. UE 115c may communicate with UEs 115a and 115b via sidelink communication links 210a and 210b, respectively. In some examples, UE 115c may transmit SCI to UEs 115a and 115b via the sidelink control resources 220. The SCI may include an indication of resources reserved for retransmissions by UE 115c (e.g., the reserved resources 225). In some examples, UEs 115a and 115b may determine to reuse one or more of the reserved resources 225.

In some aspects, a device in the wireless communication network 200 (e.g., a UE 115, a BS 105, or some other node) may convey SCI to another device (e.g., another UE 115, a BS 105, sidelink device or vehicle-to-everything (V2X) device, or other node). The SCI may be conveyed in one or more stages. The first stage SCI may be carried on the PSCCH while the second stage SCI may be carried on the corresponding PSSCH. For example, UE 115c may transmit a PSCCH/first stage SCI 235 (e.g., SCI-1) to each sidelink UE 115 in the network (e.g., UEs 115a and 115b) via the sidelink communication links 210. The PSCCH/first stage SCI-1 235 may indicate resources that are reserved by UE 115c for retransmissions (e.g., the SCI-1 may indicate the reserved resources 225 for retransmissions). Each sidelink UE 115 may decode the first stage SCI-1 to determine where the reserved resources 225 are located (e.g., to refrain from using resources that are reserved for another sidelink transmission and/or to reduce resource collision within the wireless communications network 200). Sidelink communication may include a mode 1 operation in which the UEs 115 are in a coverage area of BS 105a. In mode 1, the UEs 115 may receive a configured grant from the BS 105a that defines parameters for the UEs 115 to access the channel. Sidelink communication may also include a mode 2 operation in which the UEs 115 operate autonomously from the BS 105a and perform sensing of the channel to gain access to the channel. In some aspects, during mode 2 sidelink operations, the sidelink UEs 115 may perform channel sensing to locate resources reserved by other sidelink transmissions. The first stage SCI-1 may reduce the need for sensing each channel. For example, the first stage SCI-1 may include an explicit indication such that the UEs 115 may refrain from blindly decoding each channel. The first stage SCI-1 may be transmitted via the sidelink control resources 220. The sidelink control resources 220 may be configured resources (e.g., time resources or frequency resources) transmitted via a PSCCH 235. In some examples, the PSCCH 235 may be configured to occupy a number of physical resource blocks (PRBs) within a selected frequency. The frequency may include a single subchannel 250 (e.g., 10, 12, 15, 20, 25, or some other number of RBs within the subchannel 250). The time duration of the PSCCH 235 may be configured by the BS 105a (e.g., the PSCCH 235 may span 1, 2, 3, or some other number of symbols 255).

The first stage SCI-1 may include one or more fields to indicate a location of the reserved resources 225. For example, the first stage SCI-1 may include, without limitation, one or more fields to convey a frequency domain resource allocation (FDRA), a time domain resource allocation (TDRA), a resource reservation period 245 (e.g., a period for repeating the SCI transmission and the corresponding reserved resources 225), a modulation and coding scheme (MCS) for a second stage SCI-2 240, a beta offset value for the second stage SCI-2 240, a DMRS port (e.g., one bit indicating a number of data layers), a physical sidelink feedback channel (PSFCH) overhead indicator, a priority, one or more additional reserved bits, or a combination thereof. The beta offset may indicate the coding rate for transmitting the second stage SCI-2 240. The beta offset may indicate an offset to the MCS index. The MCS may be indicated by an index ranging from 0 to 31. For example, if the MCS is set at index 16 indicating a modulation order of 4 and a coding rate of 378, the beta offset may indicate a value of 2 thereby setting the coding rate to 490 based on an MCS index of 18. In some examples, the FDRA may be a number of bits in the first stage SCI-1 that may indicate a number of slots 238 and a number of subchannels reserved for the reserved resources 225 (e.g., a receiving UE 115 may determine a location of the reserved resources 225 based on the FDRA by using the subchannel 250 including the PSCCH 235 and first stage SCI-1 as a reference). The TDRA may be a number of bits in the first stage SCI-1 (e.g., 5 bits, 9 bits, or some other number of bits) that may indicate a number of time resources reserved for the reserved resources 225. In this regard, the first stage SCI-1 may indicate the reserved resources 225 to the one or more sidelink UEs 115 in the wireless communication network 200.

In some aspects, the BS 105 may configure a sidelink UE 115 as a sidelink sync UE (e.g., the UE 115c). When operating as a sidelink sync UE, the UE 115 may broadcast S-SSBs which may include synchronization signals (e.g., PSS and/or SSS) and sidelink system information, such as a sidelink BWP configuration, one or more sidelink transmit resource pools, and/or one or more sidelink receive resource pools, S-SSB transmission related parameters (e.g., sidelink slots 238 configured for S-SSB transmission and/or S-SSB transmission periodicity), and/or any other configuration information related to sidelink communications as will be discussed more fully below. Accordingly, other UEs (e.g., the UEs 115d and 115e) that are nearby the UE 115c, but may be out of the coverage of the BS 105 may listen to and synchronize to the S-SSBs and communicate with each other based on the S-SSBs.

Figure 3:
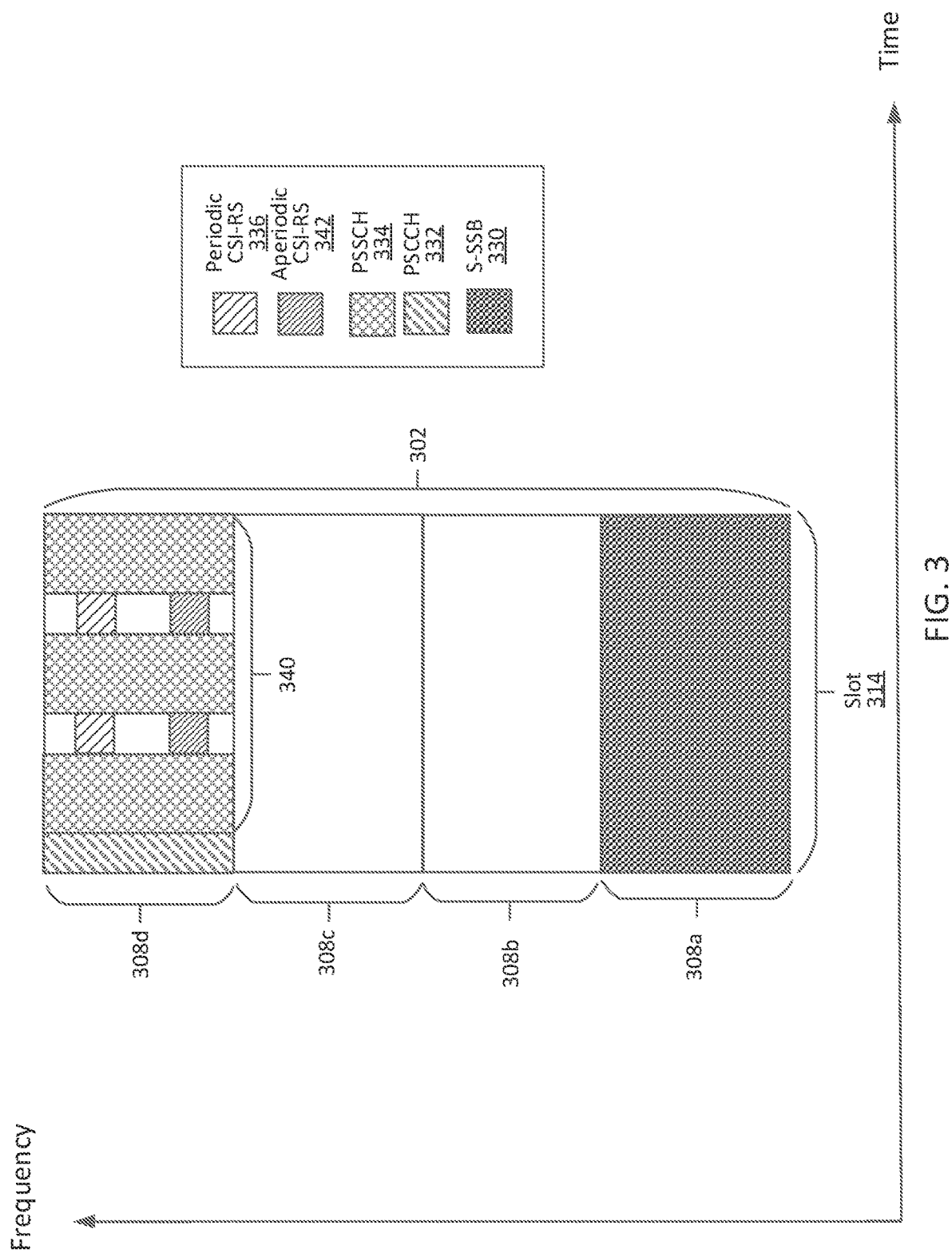
FIG. 3 illustrates an S-SSB and CSI-RS multiplexing scheme according to some aspects of the present disclosure.

FIG. 3 CSI-RS multiplexing scheme according to some aspects of the present disclosure. In FIG. 3, the x-axis represents time in some arbitrary units and the Y-axis represents frequency in some arbitrary units. In some aspects, a BS (e.g., the BS 105 or the BS 800) may configure a sidelink resource pool including a plurality of slots 314 in time and a plurality of frequency ranges 308 for frequency-multiplexed S-SSB 330 and CSI-RS 336 transmissions in the SL BWP within the frequency band 302. In this regard, the UE 115a may receive the resource pool configuration from the BS 105 in a radio resource control (RRC) message, downlink control information (DCI), and/or other suitable communication. The BS 105 may configure a sidelink sync UE 115a to transmit an S-SSB 330 in a slot 314 according to a sync raster. To satisfy an OCB requirement of the frequency band 302, the sidelink sync UE 115a may also transmit one or more CSI-RSs 336 in one or more frequency ranges 308 at the same time as the S-SSB 330 transmission in the slot 314. In this regard, the UE 115a may transmit the one or more CSI-RS 336 in a PSSCH region 340 (e.g., symbol indexes 2-13) of the slot 314 to satisfy an occupied channel bandwidth (OCB) requirement. In some aspects, the UE 115a and/or the UE 115c may be a sidelink UE. The UE 115a may transmit the CSI-RS(s) 336 in the slot 314 that is configured for S-SSB 330 transmission. The UE 115a may multiplex transmissions of S-SSBs 330 and CSI-RS(s) 336 in the slot 314. The UE 115a may multiplex the transmissions of S-SSBs 330 and CSI-RS(s) 336 in the time and/or frequency domains. In this regard, the UE 115a may receive the resource pool configuration from the BS in a radio resource control (RRC) message, downlink control information (DCI), and/or other suitable communication.

The UE 115a may periodically and/or aperiodically transmit the CSI-RS(s) to the UE 115c in the slot. For example, the UE 115a may periodically transmit the CSI-RS(s) 336 in one or more slots 314. In some aspects, the UE 115a may be configured as a sidelink sync UE. The sidelink sync UE 115a may be configured to periodically transmit (e.g., broadcast) S-SSBs 330 or other communication signals to other sidelink UEs 115 to enable synchronized communication between the UEs 115. However, transmitting S-SSBs 330 in the slot 314 alone may not satisfy the OCB requirement. In some aspects, the UE 115a may transmit a PSSCH 334 and/or a PSCCH 332 along with the S-SSBs 330 to satisfy the OCB requirement. However, in some instances the UE 115a may not have data (e.g., TBs) to transmit in the same slot 314 as the S-SSBs 330. Instead, the OCB may be satisfied based on the UE 115a transmitting the CSI-RS(s) 336 along with the S-SSBs 330. In some instances, the UE 115a may periodically transmit the CSI-RS(s) 336 at a periodicity based on a S-SSB 330 transmission periodicity. The UE 115a may transmit S-SSBs 330 according to a SSB transmission periodicity, for example, at about 40 ms, 80 ms, 160 ms, or any suitable periodicity. The UE 115a may transmit the CSI-RS(s) 336 at a periodicity equal to, a multiple of, and/or a factor of the S-SSB transmission periodicity.

In some aspects, the UE 115a may transmit the one or more CSI-RSs 336 in one or more slots 314 via a contiguous range of frequencies 308 (e.g., subchannels). For example, the UE 115a may the transmit the CSI-RS(s) 336 via a plurality of frequency subchannels (e.g., contiguous resource blocks (RBs)), where each subchannel may carry one or more CSI-RS 336 transmissions. The UE 115a may determine the number of subchannels to transmit the CSI-RS(s) in order to satisfy the OCB requirement. The UE 115a may receive an indicator indicating a frequency range 308 in which the UE 115a may transmit the CSI-RS(s) 336. For example, the UE 115a may receive an indicator from a BS (e.g., the BS 105 or the BS 800) indicating the frequency range 308d in which the UE 115a may transmit the CSI-RS (s) 336. Additionally or alternatively, the UE 115a may determine the frequency range 308d to transmit the CSI-RS (s) 336. For example, the UE 115a may determine the frequency range 308d to transmit the CSI-RS(s) 336 based on an identifier associated with the UE 115a (e.g., the source ID) transmitting the CSI-RS(s) 336 and/or the UE 115c (e.g., the destination ID) that receives the CSI-RS(s) 336. In some aspects, the UE 115a may determine the frequency range to transmit the CSI-RS(s) 336 based on a hashing function associated with an index of the slot 314. For example, each slot 314 may have an index value associated with the slot 314. The UE 115a may perform a hashing function (e.g., a message digest (MD) hashing algorithm, a secure hashing algorithm, or other suitable hashing function) on the slot 314 index to determine the frequency range 308d for transmitting the CSI-RS(s) 336.

In some aspects, the UE 115a may transmit the CSI-RSs 336 in one or more slots 314 via an interlaced range of frequencies. In some aspects, the UE 115a may receive a resource pool configuration from a BS (e.g., the BS 105 or the BS 800). For example, a frequency-interlaced-based sidelink resource pool may include a plurality of frequency interlaces over a frequency band 302 (e.g., a 20 MHz frequency band, a 40 MHz frequency band, an 80 MHz frequency band, a 160 MHz frequency band, a licensed frequency band, an unlicensed frequency band, etc.), where each frequency interlace may include a plurality of resource blocks (RBs) distributed over the frequency band 302. For example, the plurality of RBs of a frequency interlace may be spaced apart from each other by one or more other RBs in the frequency band 302. The UE 115a may select resources from the resource pool for transmitting the CSI-RS(s) 336. The UE 115a may select a sidelink resource in the form of one or more frequency interlaces from the sidelink resource pool for sidelink communication. Sidelink transmissions may utilize a frequency-interlaced waveform to satisfy an OCB associated with the frequency band 302. In some aspects, the UE 115a may determine a subset of the plurality of RBs in the frequency interlace that are non-overlapping with frequency range 308a used by the S-SSB 330 transmission. For example, the UE 115a may avoid selecting frequency interlaces in the lower portion of the BWP (e.g., frequency range 308a) to avoid an overlap with the S-SSB 330 transmission.

In some aspects, the UE 115a may transmit CSI-RS(s) 336 in each slot 314 in which the UE 115a transmits the S-SSBs 330 to satisfy the OCB requirement. For example, the UE 115a may transmit the CSI-RS(s) 336 in a frequency range 308d in every slot 314 that the UE 115a transmits the S-SSBs 330 in a frequency range 308a. In some aspects, the UE 115a may transmit the CSI-RS(s) 336 in a different frequency range (e.g., frequency range 308b, 308c) in every slot 314 that the UE 115a transmits the S-SSBs 330 in a frequency range 308a. In some aspects, the UE 115a may periodically transmit the CSI-RS(s) 336 in each symbol 255 of the slot 314 (e.g., 14 symbols), a subset of symbols 255 of the slot 314 (e.g., 12 symbols), or any suitable number of symbols 255 in the slot 314.

Additionally or alternatively, the UE 115a may aperiodically transmit aperiodic CSI-RS(s) 342 to satisfy the OCB requirement. For example, the UE 115a may aperiodically transmit the aperiodic CSI-RS(s) 342 in between gaps (e.g., time gaps, frequency gaps) in periodic CSI-RS 336 transmissions. The UE 115a may transmit one or more SCI-2s in a PSSCH 334 indicating that one or more aperiodic CSI-RS(s) 342 will be transmitted. The aperiodic CSI-RS(s) 342 may be transmitted in addition to the periodic CSI-RS 336 transmissions or in lieu of the periodic CSI-RS 336 transmissions. For example, the UE 115a may determine that for any particular slot (e.g., slot 314), the OCB requirement may not be satisfied based on the periodic CSI-RS 336 transmissions alone. In this case, the UE 115a may determine the number of aperiodic CSI-RS 342 transmissions that are required to meet the OCB requirement. In some aspects, the number of aperiodic CSI-RSs 342 transmitted by the UE 115a may be based on the target UE 115c intended to receive the CSI-RS(s) 336. The UE 115a may indicate in the one or more SCI-2s in the PSSCH 334 that aperiodic CSI-RS(s) 342 will be transmitted. For example, the SCI-2s may indicate the resource elements in which the aperiodic CSI-RS(s) 342 will be transmitted. In some aspects, the PSSCH 334 carrying the SCI-2s may only carry the SCI-2s and may not carry TBs. In some aspects, the PSSCH 334 carrying the SCI-2s may carry the SCI-2s and padding data (e.g., data not intended for a destination) in TBs. The UE 115a may transmit an indicator in the SCI-1 carried by the PSCCH 332 that indicates whether the PSSCH 334 only carries the SCI-2 or carries the SCI-2 and data (e.g., sidelink data, padding data, or otherwise). For example, the SCI-1 may include a code point(s) (e.g., a reserved beta offset code point) that indicates whether the PSSCH 334 only carries the SCI-2 and does not carry TBs. In some aspects, the code point(s) may indicate whether data is carried by the PSSCH 334 in addition to the SCI-2. In some aspects, the code point(s) may indicate whether padding is carried by the PSSCH 334 in addition to the SCI-2. The one or more SCI-2s may be transmitted in any symbol 255 of the slot 314. In some aspects, the one or more SCI-2s may be rate matched around the resource elements or the symbols 255 carrying the aperiodic CSI-RS(s).

In some aspects, the UE 115a may transmit the CSI-RS(s) 336 at a power level that maintains a constant power level across each symbol 255 of the slot 314. In some aspects, satisfying an OCB requirement may include transmitting at a power level that maintains a constant power level (e.g., a power level within a range of power levels) across time and/or frequency resources. The UE 115a may transmit a PSCCH 332, a PSSCH 334, an S-SSB 330, or a CSI-RS 336 in different symbols 255 of the slot 314 at different power levels. In order to maintain a constant transmit power level across the symbols 255 in the slot 314, the UE 115a may adjust the power level of the one or more CSI-RS 336 transmissions. For example, the UE 115a may increase (e.g., boost) the power level of the CSI-RS 336 transmissions to maintain a constant power level across the different symbols 255 of the slot 314.

Figure 4:
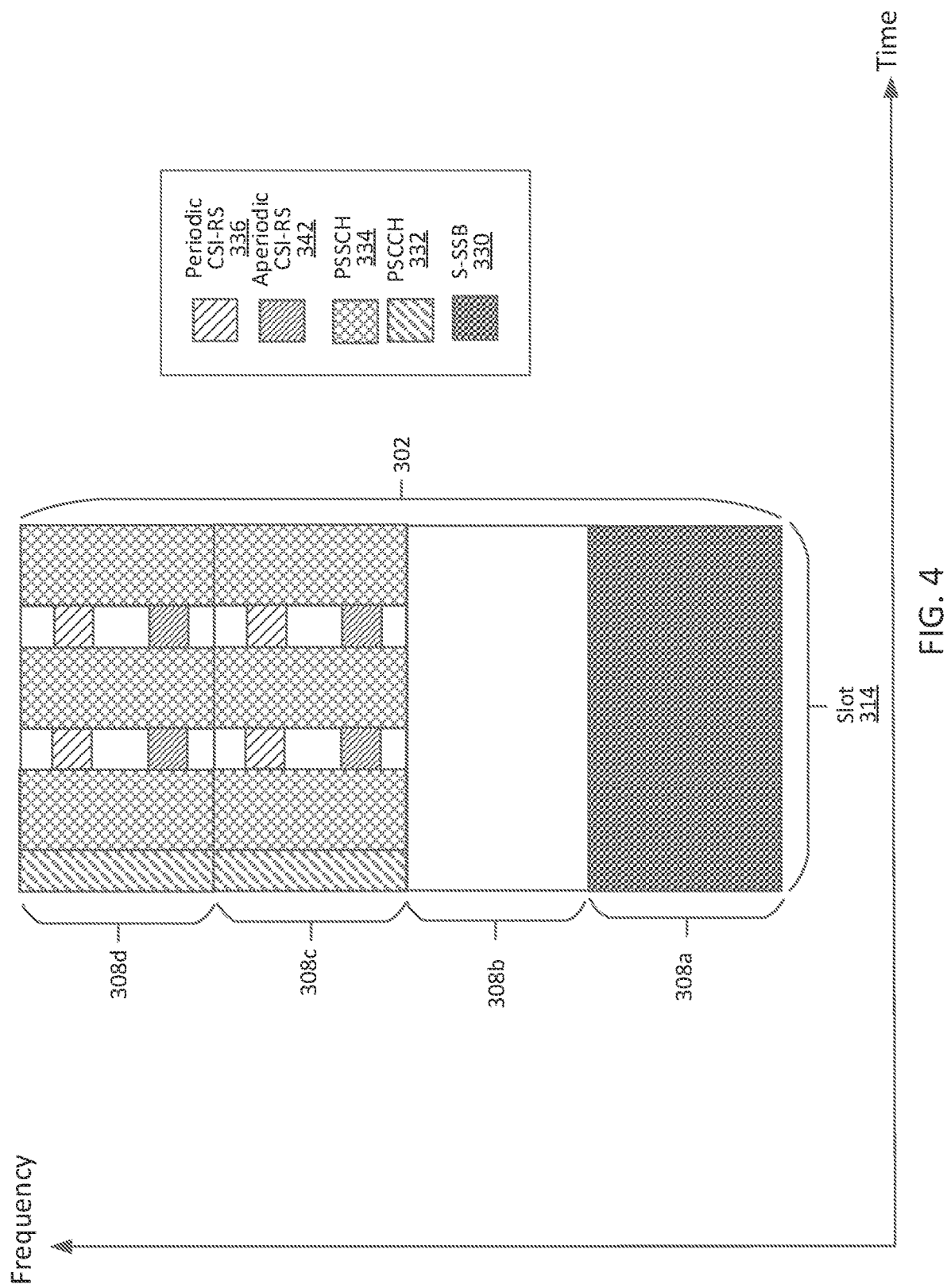
FIG. 4 illustrates another S-SSB and CSI-RS multiplexing scheme according to some aspects of the present disclosure.

FIG. 4 illustrates another S-SSB and CSI-RS multiplexing scheme according to some aspects of the present disclosure. The multiplexing scheme of FIG. 4 may be substantially similar to the multiplexing scheme of FIG. 3. However, in the multiplexing scheme of FIG. 4, multiple UEs 115 (e.g., sidelink sync UEs 115) may transmit S-SSBs 330 using the same time/frequency resources (e.g., overlapping resources) in slot 314. In this case, each of the UEs 115 transmitting the S-SSBs 330 in the same resources in slot 314 may be assigned different frequency ranges (e.g., frequency range 308b, frequency range 308c, frequency range 308d) for transmitting the CSI-RS(s) 336 in order for each of the UEs 115 to satisfy the OCB requirement. In the example of FIG. 4, a UE (e.g., UE 115a) may transmit S-SSBs 330 in frequency range 308a and transmit periodic and/or aperiodic CSI-RS(s) in frequency range 308d and another UE (e.g., UE 115b) may transmit S-SSBs 330 in frequency range 308a and transmit periodic and/or aperiodic CSI-RS(s) in frequency range 308c. The different frequency ranges 308 for transmitting the CSI-RS(s) 336 may be determined based on a unique ID (e.g., source ID) associated with each UE 115. For example, the different frequency ranges 308 may be determined based on a hashing function (e.g., a message digest (MD) hashing algorithm, a secure hashing algorithm, or other suitable hashing function) of the UE 115 source ID.

Figure 5:
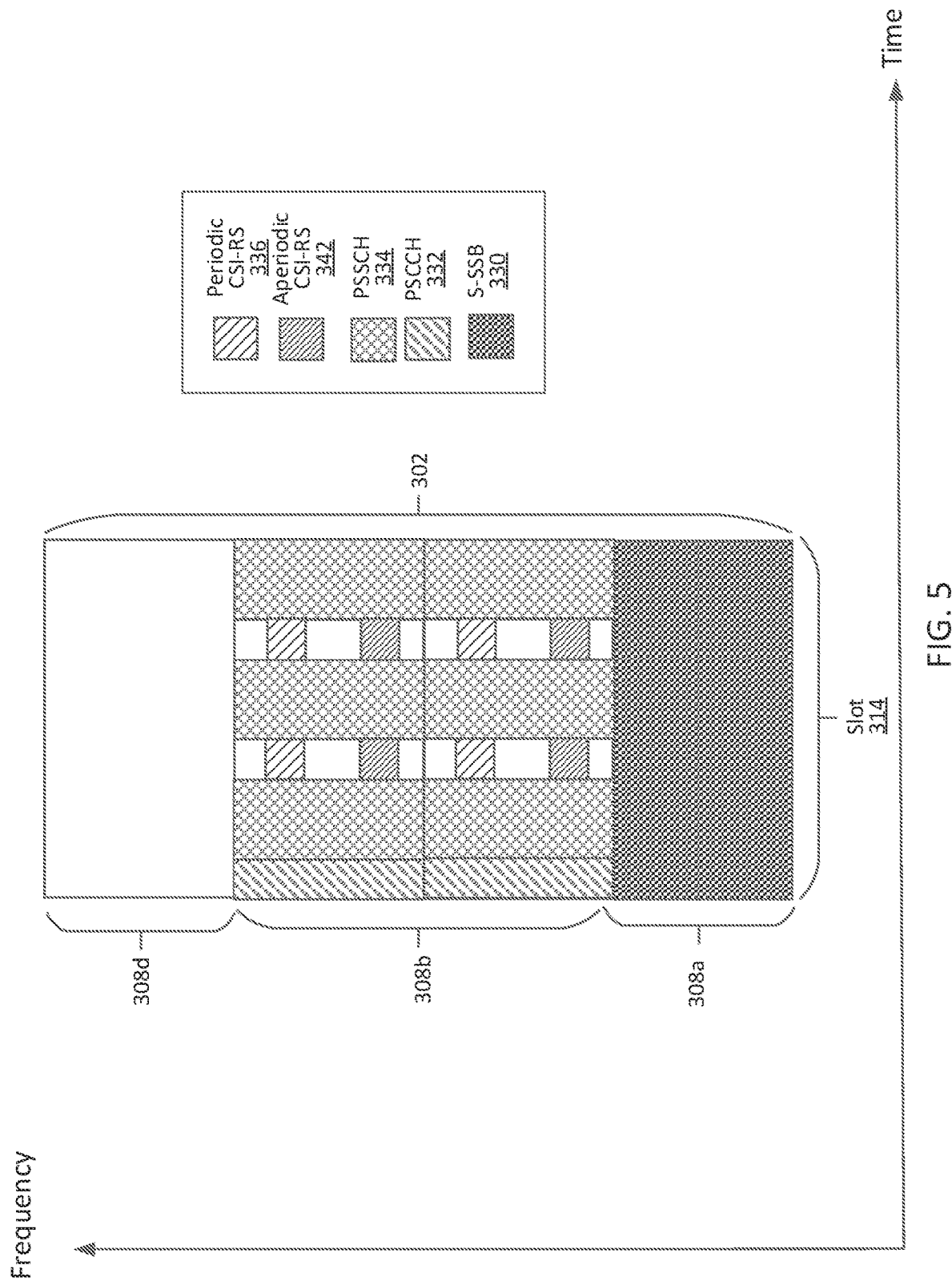
FIG. 5 illustrates another S-SSB and CSI-RS multiplexing scheme according to some aspects of the present disclosure.

FIG. 5 illustrates another S-SSB and CSI-RS multiplexing scheme according to some aspects of the present disclosure. The multiplexing scheme of FIG. 5 may be substantially similar to the multiplexing scheme of FIG. 3. However, in the example of FIG. 5, the UE 115a may transmit the S-SSBs 330 in frequency range 308a (e.g., the lowest frequency range) and transmit the CSI-RS(s) 336 in an adjacent frequency range 308b. Transmitting the S-SSBs 330 and the CSI-RS(s) 336 in adjacent frequency ranges 308a and 308b respectively may satisfy an out of band emission constraint. The frequency range 308b may include one or more contiguous subchannels. In some aspects, the UE 115a may periodically transmit the CSI-RS(s) 336 in each symbol 255 of the slot 314 (e.g., 14 symbols), a subset of symbols 255 of the slot 314 (e.g., 12 symbols), or any suitable number of symbols 255 in the slot 314.

Figure 6:
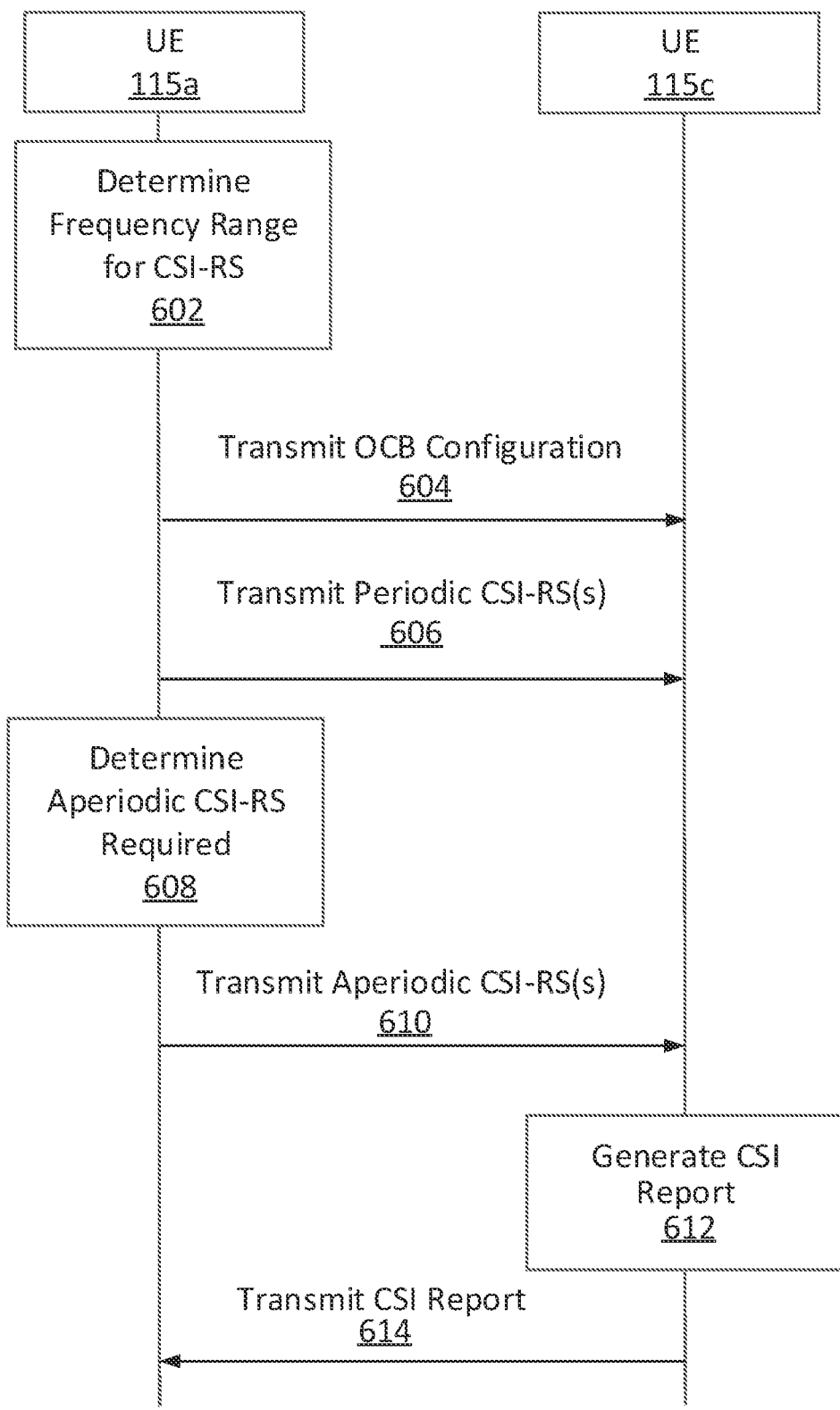
FIG. 6 is a signaling diagram of a communication method according to some aspects of the present disclosure.

FIG. 6 is a signaling diagram of a communication method according to some aspects of the present disclosure. Steps of the signaling diagram 600 can be executed by a computing device (e.g., a processor, processing circuit, and/or other suitable component) of a communication device or other suitable means for performing the steps. For example, a communication device, such as the UE 115 or the UE 700, may utilize one or more components, such as a processor 702, a memory 704, instructions 706, a S-SSB/CSI-RS multiplexing module 708, a transceiver 710, a modem 712, an RF unit 714, and one or more antennas 716 to execute the steps of method signaling diagram 600.

At action 602, the UE 115a may determine a frequency range for transmission of CSI-RS(s) multiplexed with S-SSBs in a slot. In some aspects, the UE 115a may receive a sidelink resource pool from a BS that includes the resources for transmission of the CSI-RS(s) multiplexed with the S-SSBs in the slot. In this regard, the UE 115a may receive the resource pool configuration from the BS in a radio resource control (RRC) message, downlink control information (DCI), and/or other suitable communication. For example, a sidelink resource pool may include a plurality of frequency ranges (e.g., subchannels) over a frequency band (e.g., a 20 MHz frequency band, a 40 MHz frequency band, an 80 MHz frequency band, a 160 MHz, frequency band, a licensed frequency band, an unlicensed frequency band, etc.).

At action 604, the UE 115a may transmit an OCB configuration to a UE 115c. In this regard, the UE 115c may transmit the OCB configuration in a PSCCH, a PSSCH, an SCI-1, an SCI-2, or other suitable communication. The OCB configuration may include parameters for satisfying an OCB requirement. For example, the OCB configuration may include without limitation, the sidelink resource pool (e.g., resources for transmitting CSI-RS(s) and/or TRS(s)), a frequency-interlaced-based sidelink resource pool, an SCI-1 configuration, an SCI-2 configuration, a frequency subchannel configuration, a CSI-RS transmission period, a TRS transmission period, an S-SSB transmission period, or a combination thereof.

At action 606, the UE 115a may periodically transmit a CSI-RS(s). To satisfy an OCB requirement of the frequency band, the 115a may transmit one or more CSI-RSs in the frequency band at the same time as the S-SSB transmission in the slot. In this regard, the UE 115a may transmit the CSI-RS(s) in a PSSCH region (e.g., symbol indexes 2-13) of the slot to satisfy an occupied channel bandwidth (OCB) requirement. The UE 115a may transmit the CSI-RS(s) in a slot that is configured for S-SSB transmission. The UE 115a may multiplex transmissions of S-SSBs and CSI-RS(s) in the slot. The UE 115a may multiplex the transmissions of S-SSBs and CSI-RS(s) in the time and/or frequency domains.

In some instances, the UE 115a may not have data (e.g., TBs) to transmit in the same slot as the S-SSBs. Instead, the OCB may be satisfied based on the UE 115a transmitting the CSI-RS(s) along with the S-SSBs. The UE 115a may transmit the CSI-RS(s) at a periodicity equal to, a multiple of, and/or a factor of the S-SSB transmission periodicity.

In some aspects, the UE 115 may periodically transmit the one or more CSI-RS(s) in the one or more slots via a contiguous range of frequencies. For example, the UE 115a may the transmit the one or more CSI-RS(s) via a plurality of frequency subchannels (e.g., contiguous resource blocks (RBs)), where each subchannel may carry one or more CSI-RS transmissions. The UE 115a may determine the number of subchannels to transmit the CSI-RS(s) in order to satisfy the OCB requirement. The UE 115a may receive an indicator indicating a frequency range in which the UE 115a may transmit the CSI-RS(s). For example, the UE may receive an indicator from a BS (e.g., the BS 105 or the BS 800) indicating the frequency range in which the UE may transmit the CSI-RS(s) in the OCB configuration received at action 610. Additionally or alternatively, the UE 115a may determine the frequency range to transmit the CSI-RS(s). For example, the UE 115a may determine the frequency range based on an identifier associated with the UE 115a (e.g., the source ID) transmitting the CSI-RS(s) and/or the UE 115c (e.g., the destination ID) that receives the CSI-RS (s). In some aspects, the UE 115a may determine the frequency range to transmit the CSI-RS(s) based on a hashing function associated with an index of the slot. For example, each slot may have an index value associated with the slot. The UE 115a may perform a hashing function (e.g., a message digest (MD) hashing algorithm, a secure hashing algorithm, or other suitable hashing function) on the slot index to determine the frequency range for transmitting the CSI-RS(s).

In some aspects, the UE 115a may transmit the CSI-RSs in the one or more slots via an interlaced range of frequencies. In some aspects, the UE may receive a resource pool configuration from a BS (e.g., the BS 105 or the BS 800) as described at action 602. For example, a frequency-interlaced-based sidelink resource pool may include a plurality of frequency interlaces over a frequency range (e.g., a 20 MHz frequency band, a 40 MHz frequency band, an 80 MHz frequency band, a 160 MHz, frequency band, a licensed frequency band, an unlicensed frequency band, etc.), where each frequency interlace may include a plurality of resource blocks (RBs) distributed over the frequency range. For example, the plurality of RBs of a frequency interlace may be spaced apart from each other by one or more other RBs in the frequency range. The UE 115a may select resources from the resource pool for transmitting the CSI-RS(s). The UE 115a may select a sidelink resource in the form of one or more frequency interlaces from the sidelink resource pool for sidelink communication. In some aspects, the UE 115a may determine a subset of the plurality of RBs in the frequency interlace that are non-overlapping with frequency resources used by the S-SSB transmission. For example, the UE 115a may avoid selecting frequency interlaces in the lower portion of the BWP to avoid an overlap with the S-SSB transmission.

At action 606, the UE 115a may determine whether aperiodic CSI-RS(s) are required to be transmitted to satisfy the OCB requirement. For example, the UE 115a may determine whether the transmission of periodic CSI-RS(s) multiplexed with S-SSBs at action 606 satisfy the OCB requirement. The UE 115a may determine whether the transmission of periodic CSI-RS(s) multiplexed with S-SSBs satisfy the OCB requirement by determining whether the transmission of periodic CSI-RS(s) multiplexed with S-SSBs satisfies an OCB threshold. For example, the UE 115a may determine whether the OCB is greater than a threshold (e.g., greater than 50%, greater than 60%, greater 70%, greater than 80%, or greater than 90%).

At action 610 the UE 115a may transmit the aperiodic CSI-RS(s) if the UE 115a determines at action 608 that the OCB threshold is not satisfied by transmitting periodic CSI-RS(s) multiplexed with S-SSBs. The UE 115a may transmit the aperiodic CSI-RS(s) in addition to the periodic CSI-RS transmissions or in lieu of the periodic CSI-RS transmissions. For example, the UE 115a may determine that for any particular slot, the OCB requirement may not be satisfied based on the periodic CSI-RS transmissions alone. In this case, the UE 115a may determine the number of aperiodic CSI-RS transmissions that are required to meet the OCB requirement. In some aspects, the number of aperiodic CSI-RSs transmitted by the UE 115a may be based on the UE 115c intended to receive the CSI-RS(s). The UE 115a may indicate to the UE 115c in one or more SCI-2s that aperiodic CSI-RS(s) will be transmitted. For example, the SCI-2s may indicate the resource elements in which the aperiodic CSI-RS(s) will be transmitted. In some aspects, the PSSCH carrying the SCI-2s may only carry the SCI-2s and may not carry TBs. In some aspects, the PSSCH carrying the SCI-2s may carry the SCI-2s and padding data (e.g., data not intended for a destination) in TBs. The UE 115a may transmit an indicator in the SCI-1 that indicates whether the PSSCH only carries the SCI-2 or carries the SCI-2 and data (e.g., sidelink data, padding data, or otherwise). For example, the SCI-1 may include a code point(s) (e.g., a reserved beta offset code point) that indicates whether the PSSCH only carries the SCI-2 and does not carry TBs. In some aspects, the code point(s) may indicate whether data is carried by the PSSCH in addition to the SCI-2. The one or more SCI-2s may be transmitted in any symbol of the slot. In some aspects, the one or more SCI-2s may be rate matched around the resource elements or the symbols carrying the aperiodic CSI-RS(s).

At action 612, the UE 115c may generate a CSI report. The CSI report may include information related to the channel conditions between the UE 115a and the UE 115c. For example, the CSI report may include a channel quality indicator (CQI), a reference signal received power (RSRP), a reference signal received quality (RSRQ), a signal to interference and noise ratio (SINR), and/or a rank indicator (RI). The CSI report may be based on the CSI-RS(s) received from the UE 115a at actions 606 and/or 610.

At action 614, the UE 115c may transmit the CSI report to the UE 115a. The UE 115c may perform the CSI measurements based on the received CSI-RS(s), generate the CSI report, and transmit the CSI report to the UE 115a. In some aspects, the UE 115c may periodically transmit the CSI report(s) to the UE 115a. In this regard, the UE 115c may transmit the CSI report to the UE 115a using layer 3 signaling (e.g., PC5-RRC signaling), a PSSCH, a PSCCH, or a combination thereof. The UE 115a may adjust future communications based on the CSI report.

Figure 7:
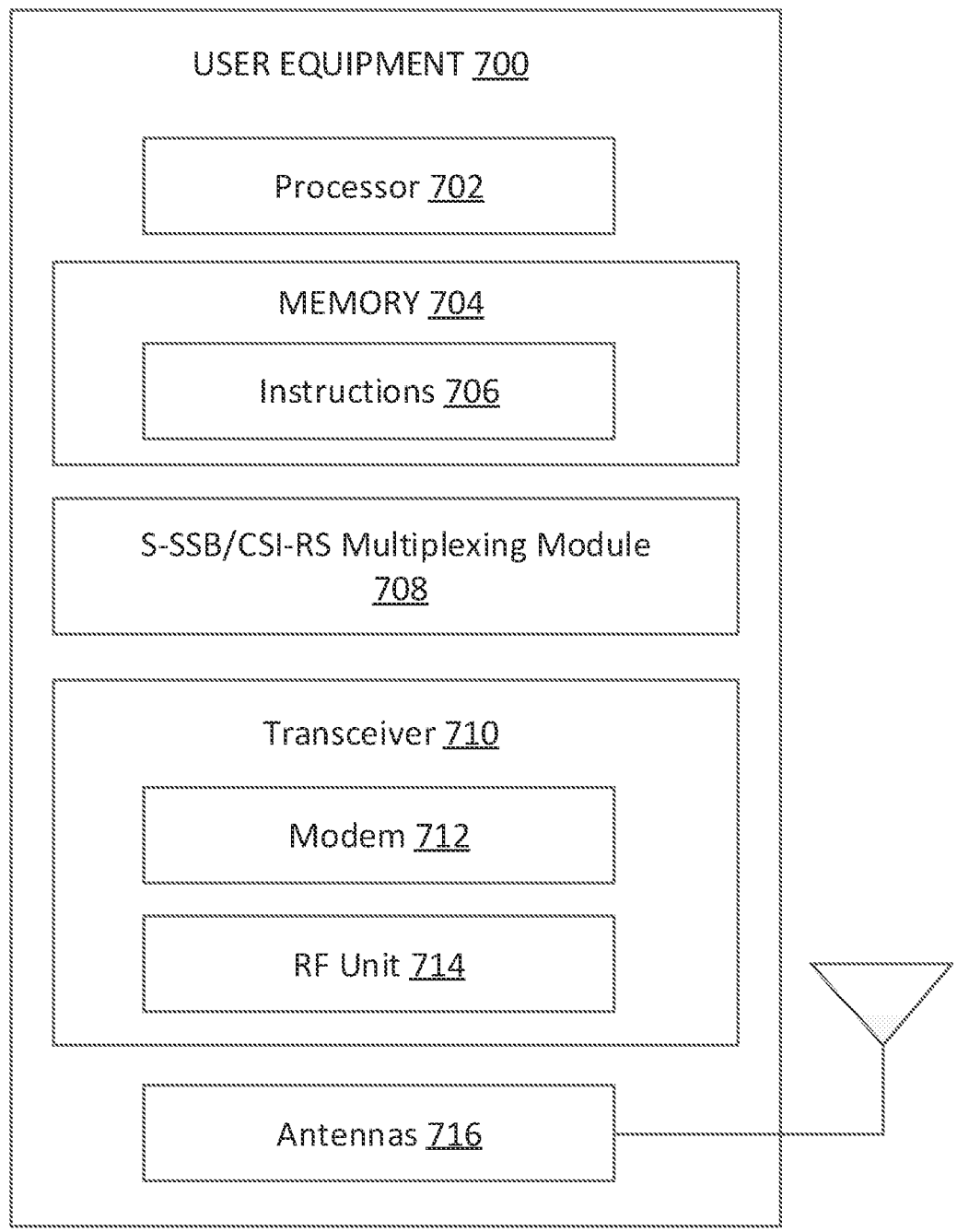
FIG. 7 is a block diagram of an exemplary user equipment (UE) according to some aspects of the present disclosure.

FIG. 7 is a block diagram of an exemplary UE 700 according to some aspects of the present disclosure. The UE 700 may be the UE 115 in the network 100 or 200 as discussed above. As shown, the UE 700 may include a processor 702, a memory 704, a S-SSB/CSI-RS multiplexing module 708, a transceiver 710 including a modem subsystem 712 and a radio frequency (RF) unit 714, and one or more antennas 716. These elements may be coupled with each other and in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 704 includes a non-transitory computer-readable medium. The memory 704 may store instructions 706. The instructions 706 may include instructions that, when executed by the processor 702, cause the processor 702 to perform the operations described herein with reference to the UEs 115 in connection with aspects of the present disclosure, for example, aspects of FIGS. 2-6 and 9-10. Instructions 706 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The S-SSB/CSI-RS multiplexing module 708 may be implemented via hardware, software, or combinations thereof. For example, the S-SSB/CSI-RS multiplexing module 708 may be implemented as a processor, circuit, and/or instructions 706 stored in the memory 704 and executed by the processor 702.

In some aspects, the S-SSB/CSI-RS multiplexing module 708 is configured to configure a sidelink sync UE to transmit the S-SSB transmission. In some aspects, the S-SSB/CSI-RS multiplexing module 708 is configured to configure a sidelink sync UE to multiplex the S-SSB transmission with the CSI-RS transmission using a frequency interlace (e.g., distributed RBs). In some aspects, the S-SSB/CSI-RS multiplexing module 708 is configured to configure a sidelink sync UE to multiplex the S-SSB transmission with the CSI-RS transmission in a subchannel (e.g., contiguous RBs) and may configure the sidelink sync UE to select between a frequency interlace-based resource pool or a subchannel-based resource pool.

As shown, the transceiver 710 may include the modem subsystem 712 and the RF unit 714. The transceiver 710 can be configured to communicate bi-directionally with other devices, such as the BSs 105 and/or the UEs 115. The modem subsystem 712 may be configured to modulate and/or encode the data from the memory 704 and the S-SSB/CSI-RS multiplexing module 708 according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together to enable the UE 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The antennas 716 may include multiple antennas of similar or different designs in order to sustain multiple transmission links. The RF unit 714 may configure the antennas 716.

In some instances, the UE 700 can include multiple transceivers 710 implementing different RATs (e.g., NR and LTE). In some instances, the UE 700 can include a single transceiver 710 implementing multiple RATs (e.g., NR and LTE). In some instances, the transceiver 710 can include various components, where different combinations of components can implement RATs.

In some aspects, the processor 702 may be coupled to the memory 704, the S-SSB/CSI-RS multiplexing module 708, and/or the transceiver 710. The processor 702 and may execute operating system (OS) code stored in the memory 704 in order to control and/or coordinate operations of the S-SSB/CSI-RS multiplexing module 708 and/or the transceiver 710. In some aspects, the processor 702 may be implemented as part of the S-SSB/CSI-RS multiplexing module 708.

Figure 8:
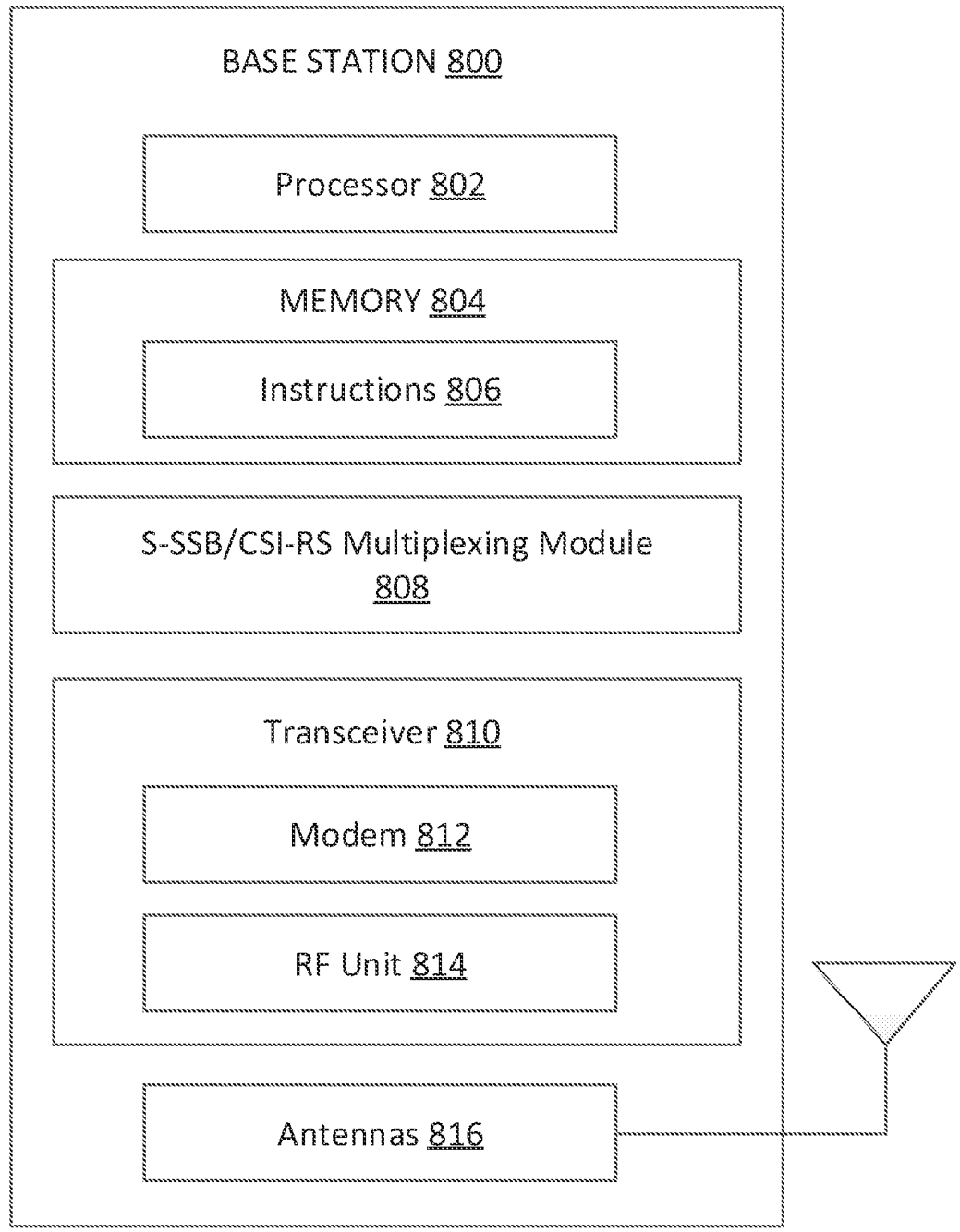
FIG. 8 is a block diagram of an exemplary base station (BS) according to some aspects of the present disclosure.

FIG. 8 is a block diagram of an exemplary BS 800 according to some aspects of the present disclosure. The BS 800 may be a BS 105 as discussed above. As shown, the BS 800 may include a processor 802, a memory 804, a S-SSB/CSI-RS multiplexing module 808, a transceiver 810 including a modem subsystem 812 and a RF unit 814, and one or more antennas 816. These elements may be coupled with each other and in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 2-6 and 9-10. Instructions 806 may also be referred to as code, which may be interpreted broadly to include any type of computer-readable statement(s).

The S-SSB/CSI-RS multiplexing module 808 may be implemented via hardware, software, or combinations thereof. For example, the S-SSB/CSI-RS multiplexing module 808 may be implemented as a processor, circuit, and/or instructions 806 stored in the memory 804 and executed by the processor 802.

The S-SSB/CSI-RS multiplexing module 808 may be used for various aspects of the present disclosure, for example, aspects of FIGS. 2-6 and 9-10. In some aspects, the S-SSB/CSI-RS multiplexing module 708 is configured to configure a sidelink sync UE to transmit the S-SSB transmission. In some aspects, the S-SSB/CSI-RS multiplexing module 708 is configured to transmit a resource pool configuration to a UE (e.g., the UE 115 or the UE 700) for the UE to multiplex a S-SSB transmission with a CSI-RS transmission. In some aspects, the S-SSB/CSI-RS multiplexing module 708 is configured to configure a sidelink sync UE to multiplex the S-SSB transmission with the CSI-RS transmission using a frequency interlace (e.g., distributed RBs). In some aspects, the S-SSB/CSI-RS multiplexing module 708 is configured to configure a sidelink sync UE to multiplex the S-SSB transmission with the CSI-RS transmission in a subchannel (e.g., contiguous RBs) and may configure the sidelink sync UE to select between a frequency interlace-based resource pool or a subchannel-based resource pool.

Additionally or alternatively, the S-SSB/CSI-RS multiplexing module 808 can be implemented in any combination of hardware and software, and may, in some implementations, involve, for example, processor 802, memory 804, instructions 806, transceiver 810, and/or modem 812.

As shown, the transceiver 810 may include the modem subsystem 812 and the RF unit 814. The transceiver 810 can be configured to communicate bi-directionally with other devices, such as the UEs 115 and/or 800. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 115 or UE 700. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 800 to enable the BS 800 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, a configuration indicating a plurality of sub-slots within a slot according to aspects of the present disclosure. The antennas 816 may further receive data messages transmitted from other devices and provide the received data messages for processing and/or demodulation at the transceiver 810. The antennas 816 may include multiple antennas of similar or different designs in order to sustain multiple transmission links.

In some instances, the BS 800 can include multiple transceivers 810 implementing different RATs (e.g., NR and LTE). In some instances, the BS 800 can include a single transceiver 810 implementing multiple RATs (e.g., NR and LTE). In some instances, the transceiver 810 can include various components, where different combinations of components can implement RATs.

In some aspects, the processor 802 may be coupled to the memory 804, the S-SSB/CSI-RS multiplexing module 808, and/or the transceiver 810. The processor 802 may execute OS code stored in the memory 804 to control and/or coordinate operations of the S-SSB/CSI-RS multiplexing module 808, and/or the transceiver 810. In some aspects, the processor 802 may be implemented as part of the S-SSB/CSI-RS multiplexing module 808. In some aspects, the processor 802 is configured to transmit via the transceiver 810, to a UE, an indicator indicating a configuration of sub-slots within a slot.

Figure 9:
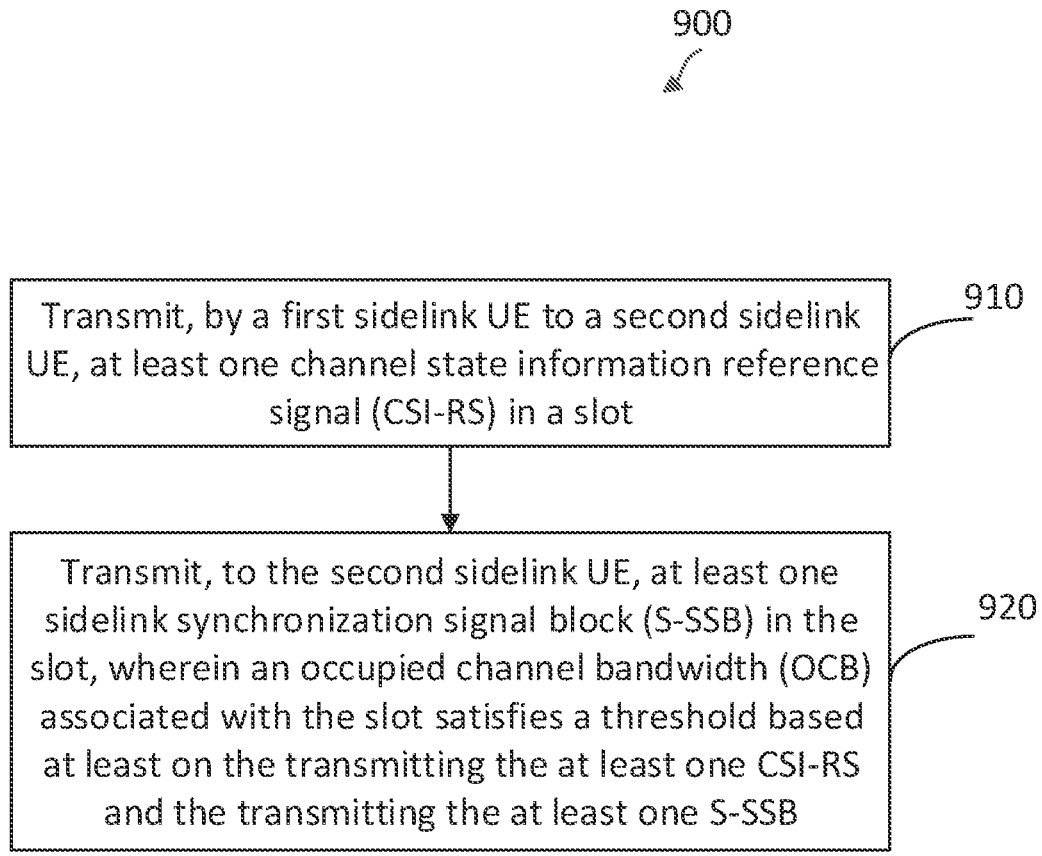
FIG. 9 is a flow diagram of a communication method according to some aspects of the present disclosure.

FIG. 9 is a flow diagram of a communication method 900 according to some aspects of the present disclosure. Aspects of the method 900 can be executed by a computing device (e.g., a processor, processing circuit, and/or other suitable component) of a wireless communication device or other suitable means for performing the actions. For example, a wireless communication device, such as the UE 115 or UE 700, may utilize one or more components, such as the processor 702, the memory 704, the S-SSB/CSI-RS multiplexing module 708, the transceiver 710, the modem 712, and the one or more antennas 716, to execute aspects of method 900. The method 900 may employ similar mechanisms as in the networks 100 and 200 and the aspects and actions described with respect to FIGS. 2-6. As illustrated, the method 900 includes a number of enumerated actions, but the method 900 may include additional actions before, after, and in between the enumerated actions. In some aspects, one or more of the enumerated actions may be omitted or performed in a different order.

At action 910, the method 900 includes a first UE (e.g., the UE 115 or the UE 700) transmitting at least one channel state information reference signal (CSI-RS) to a second UE in a slot. In this regard, the first UE may transmit the CSI-RS(s) in a PSSCH region (e.g., symbol indexes 2-13) of the slot to satisfy an occupied channel bandwidth (OCB) requirement. In some aspects, the first UE and/or the second UE may be a sidelink UE. The first UE may transmit the CSI-RS(s) in a slot that is configured for S-SSB transmission. The UE may multiplex transmissions of S-SSBs and CSI-RS(s) in the slot. The UE may multiplex the transmissions of S-SSBs and CSI-RS(s) in the time and/or frequency domains. The first UE may receive a resource pool configuration from a BS (e.g., the BS 105 or the BS 800) that configures the time and/or frequency resources for the multiplexed transmissions of S-SSBs and CSI-RSs. In this regard, the first UE may receive the resource pool configuration from the BS in a radio resource control (RRC) message, downlink control information (DCI), and/or other suitable communication.

The UE may periodically and/or aperiodically transmit the CSI-RS(s) to the second UE in the slot. For example, the UE may periodically transmit the CSI-RS(s) in one or more slots. In some aspects, the UE may be configured as a sidelink sync UE. A sidelink sync UE may be configured to periodically transmit (e.g., broadcast) S-SSBs or other communication signals to other sidelink UEs to enable synchronized communication between UEs. However, transmitting S-SSBs in the slot alone may not satisfy the OCB requirement. In some aspects, the UE may transmit a PSSCH and/or a PSCCH along with the S-SSBs to satisfy the OCB requirement. However, in some instances the UE may not have data (e.g., TBs) to transmit in the same slot as the S-SSBs. Instead, the OCB may be satisfied based on the UE transmitting the CSI-RS(s) along with the S-SSBs. In some instances, the UE may periodically transmit the CSI-RS(s) at a periodicity based on a S-SSB transmission periodicity. The UE may transmit S-SSBs according to a SSB transmission periodicity, for example, at about 40 ms, 80 ms, 160 ms, or any suitable periodicity. The UE may transmit the CSI-RS(s) at a periodicity equal to, a multiple of, and/or a factor of the S-SSB transmission periodicity.

In some aspects, the UE may transmit the one or more CSI-RS(s) in the one or more slots via a contiguous range of frequencies. For example, the UE may the transmit the one or more CSI-RS(s) via a plurality of frequency subchannels (e.g., contiguous resource blocks (RBs)), where each subchannel may carry one or more CSI-RS transmissions. The UE may determine the number of subchannels to transmit the CSI-RS(s) in order to satisfy the OCB requirement. The UE may receive an indicator indicating a frequency range in which the UE may transmit the CSI-RS(s). For example, the UE may receive an indicator from a BS (e.g., the BS 105 or the BS 800) indicating the frequency range in which the UE may transmit the CSI-RS(s). Additionally or alternatively, the UE may determine the frequency range to transmit the CSI-RS(s). For example, the first UE may determine the frequency range based on an identifier associated with the first UE (e.g., the source ID) transmitting the CSI-RS(s) and/or the second UE (e.g., the destination ID) that receives the CSI-RS(s). In some aspects, the UE may determine the frequency range to transmit the CSI-RS(s) based on a hashing function associated with an index of the slot. For example, each slot may have an index value associated with the slot. The UE may perform a hashing function (e.g., a message digest (MD) hashing algorithm, a secure hashing algorithm, or other suitable hashing function) on the slot index to determine the frequency range for transmitting the CSI-RS(s).

In some aspects, the UE may transmit the CSI-RSs in the one or more slots via an interlaced range of frequencies. In some aspects, the UE may receive a resource pool configuration from a BS (e.g., the BS 105 or the BS 800). For example, a frequency-interlaced-based sidelink resource pool may include a plurality of frequency interlaces over a frequency range (e.g., a 20 MHz frequency band, a 40 MHz frequency band, an 80 MHz frequency band, a 160 MHz frequency band, a licensed frequency band, an unlicensed frequency band, etc.), where each frequency interlace may include a plurality of resource blocks (RBs) distributed over the frequency range. For example, the plurality of RBs of a frequency interlace may be spaced apart from each other by one or more other RBs in the frequency range. The UE may select resources from the resource pool for transmitting the CSI-RS(s). The UE may select a sidelink resource in the form of one or more frequency interlaces from the sidelink resource pool for sidelink communication. Sidelink transmissions may utilize a frequency-interlaced waveform to satisfy an OCB associated with the frequency range. In some aspects, the UE may determine a subset of the plurality of RBs in the frequency interlace that are non-overlapping with frequency resources used by the S-SSB transmission. For example, the UE may avoid selecting frequency interlaces in the lower portion of the BWP to avoid an overlap with the S-SSB transmission.

At action 920, the method 900 includes the first UE (e.g., the UE 115 or the UE 700) transmitting at least one sidelink synchronization signal block (S-SSB) in the slot. In some aspects, an occupied channel bandwidth (OCB) associated with the slot may satisfy an OCB requirement based on the UE transmitting the CSI-RS(s) and the S-SSBs in the slot. To satisfy an OCB requirement in a sidelink slot configured for an S-SSB transmission, the sidelink UE may transmit an S-SSB transmission (e.g., action 920 of the method 900) multiplexed with one or more CSI-RS transmissions (e.g., action 910 of the method 900). For example, the S-SSB transmission may be transmitted in frequency resources located at a lower frequency portion of a SL bandwidth part (BWP) and the one or more CSI-RS transmissions may be transmitted in frequency resources located at a higher frequency portion of the sidelink BWP.

In some aspects, the UE may transmit CSI-RS(s) in each slot in which the UE transmits the S-SSBs to satisfy the OCB requirement. The UE may multiplex the transmission of the CSI-RS(s) and the S-SSBs in the frequency domain. For example, the UE may transmit the CSI-RS(s) in a first frequency range and transmit the S-SSBs in a second frequency range. The second frequency range may be adjacent to the first frequency range. Transmitting the CSI-RS(s) and S-SSBs in adjacent frequency ranges may satisfy an out of band emission constraint. The first frequency range may include one or more contiguous subchannels. In some aspects, the UE may transmit the S-SSB transmissions aligned to the second frequency (e.g., a lowest frequency of the sidelink BWP). The UE may transmit the CSI-RS(s) in the frequency adjacent to the lowest frequency in the sidelink BWP. In some aspects, the UE may periodically transmit the CSI-RS(s) in each symbol of the slot (e.g., 14 symbols), a subset of symbols of the slot (e.g., 12 symbols), or any suitable number of symbols in the slot.

Additionally or alternatively, the UE may aperiodically transmit the CSI-RS(s) to satisfy the OCB requirement. For example, the UE may aperiodically transmit the CSI-RS(s) in between gaps (e.g., time gaps, frequency gaps) in periodic CSI-RS transmissions. The UE may transmit one or more SCI-2s in a PSSCH indicating that one or more aperiodic CSI-RS(s) will be transmitted. The aperiodic CSI-RS(s) may be transmitted in addition to the periodic CSI-RS transmissions or in lieu of the periodic CSI-RS transmissions. For example, the UE may determine that for any particular slot, the OCB requirement may not be satisfied based on the periodic CSI-RS transmissions alone. In this case, the UE may determine the number of aperiodic CSI-RS transmissions that are required to meet the OCB requirement. In some aspects, the number of aperiodic CSI-RSs transmitted by the UE may be based on the target UE intended to receive the CSI-RS(s). The UE may indicate in the one or more SCI-2s that aperiodic CSI-RS(s) will be transmitted. For example, the SCI-2s may indicate the resource elements in which the aperiodic CSI-RS(s) will be transmitted. In some aspects, the PSSCH carrying the SCI-2s may only carry the SCI-2s and may not carry TBs. In some aspects, the PSSCH carrying the SCI-2s may carry the SCI-2s and padding data (e.g., data not intended for a destination) in TBs. The UE may transmit an indicator in the SCI-1 that indicates whether the PSSCH only carries the SCI-2 or carries the SCI-2 and data (e.g., sidelink data, padding data, or otherwise). For example, the SCI-1 may include a code point(s) (e.g., a reserved beta offset code point) that indicates whether the PSSCH only carries the SCI-2 and does not carry TBs. In some aspects, the code point(s) may indicate whether data is carried by the PSSCH in addition to the SCI-2. In some aspects the code point(s) may indicate whether padding is carried by the PSSCH in addition to the SCI-2. The one or more SCI-2s may be transmitted in any symbol of the slot. In some aspects, the one or more SCI-2s may be rate matched around the resource elements or the symbols carrying the aperiodic CSI-RS(s).

In some aspects, multiple UEs (e.g., sidelink sync UEs) may transmit S-SSBs using the same resources. In this case, each of the UEs transmitting the S-SSBs in the same resources may be assigned different frequency resources for transmitting the CSI-RS(s) in order for each of the UEs to satisfy the OCB requirement. The different frequency resources for transmitting the CSI-RS(s) may be determined based on a unique ID (e.g., source ID) of each UE. For example, the different frequency resources may be determined based on a hashing function (e.g., a message digest (MD) hashing algorithm, a secure hashing algorithm, or other suitable hashing function) of the UE source ID.

In some aspects, the UE may transmit the CSI-RS(s) at a power level that maintains a constant power level across each symbol of the slot. In some aspects, satisfying an OCB requirement may include transmitting at a power level that maintains a constant power level (e.g., a power level within a range of power levels) across time and/or frequency resources. A UE may transmit a PSCCH, a PSSCH, an S-SSB, or a CSI-RS in different symbols of the slot and/or at different power levels. In order to maintain a constant transmit power level across the symbols in the slot, the UE may adjust the power level of the CSI-RS transmissions. For example, the UE may increase (e.g., boost) the power level of the CSI-RS transmissions to maintain a constant power level across the different symbols of the slot.

Additionally or alternatively, the UE may transmit one or more tracking reference signals (TRS) in addition to or instead of the CSI-RS(s) to satisfy the OCB requirement. The TRS may be a reference signal intended to assist the UEs with time and frequency tracking. The UE may multiplex transmissions of S-SSBs and TRS(s) in the slot. The UE may multiplex the transmissions of S-SSBs and TRS(s) in the time and/or frequency domains. The first UE may receive a resource pool configuration from a BS (e.g., the BS 105 or the BS 800) that configures the time and/or frequency resources for the multiplexed transmissions of S-SSBs and TRS(s). The UE may periodically and/or aperiodically transmit the TRS(s) to the second UE in the slot. The UE may transmit the TRS(s) in one or more slots. The OCB may be satisfied based on the UE periodically and/or aperiodically transmitting the TRS(s) in one or more slots along with the S-SSBs. The UE may periodically transmit the TRS(s) at a periodicity based on a S-SSB transmission periodicity. The UE may transmit S-SSBs according to an S-SSB transmission periodicity, for example, at about 40 ms, 80 ms, 160 ms, or any suitable periodicity. The UE may transmit the TRS(s) at a periodicity equal to and/or a multiple of the S-SSB transmission periodicity.

In some aspects, the UE may transmit one or more SCI-2s in a PSSCH indicating that one or more aperiodic TRS(s) will be transmitted. The aperiodic TRS(s) may be transmitted in addition to or in lieu of the periodic TRS transmissions. For example, the UE may determine that for any particular slot, the OCB requirement may not be satisfied based on the periodic TRS transmissions alone. In this case the UE may determine the number of aperiodic TRS transmissions that are required to meet the OCB requirement. In some aspects, the number of aperiodic TRS(s) transmitted by the UE may be based on the target UE intended to receive the TRS(s). The UE may indicate in the one or more SCI-2s that aperiodic TRS(s) will be transmitted. For example, the SCI-2s may indicate the resource elements in which the aperiodic TRS(s) will be transmitted. The SCI-1 may schedule resources for the SCI-2 that triggers the aperiodic TRS transmissions. In some aspects, the PSSCH carrying the SCI-2s may only carry the SCI-2s and may not carry TBs. The UE may transmit an indicator in the SCI-1 that indicates whether the PSSCH only carries the SCI-2. For example, the SCI-1 may include a code point(s) (e.g., a reserved beta offset code point) that indicates whether the PSSCH only carries the SCI-2. In some aspects, the code point(s) may indicate whether data is carried by the PSSCH. In some aspects the code point(s) may indicate whether padding is carried by the PSSCH. The one or more SCI-2s may be transmitted in any symbol of the slot. In some aspects, the one or more SCI-2s may be rate matched around the resource elements or the symbols carrying the aperiodic TRS(s).

Figure 10:
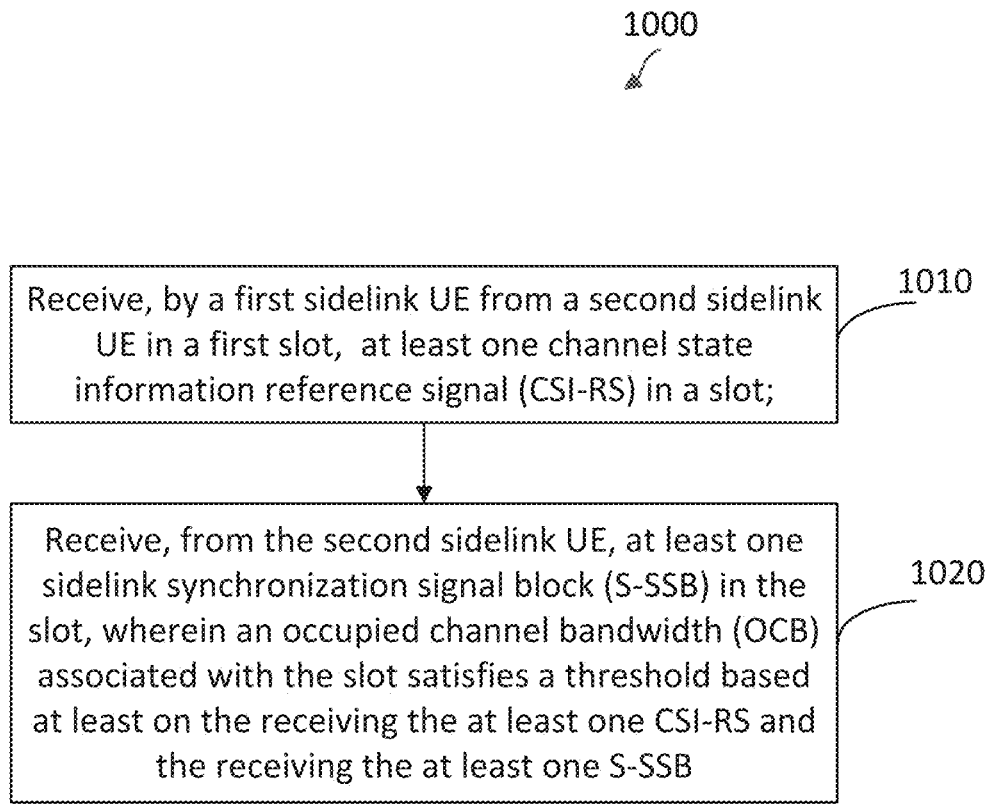
FIG. 10 is a flow diagram of a communication method according to some aspects of the present disclosure.

FIG. 10 is a flow diagram of a communication method 1000 according to some aspects of the present disclosure. Aspects of the method 1000 can be executed by a computing device (e.g., a processor, processing circuit, and/or other suitable component) of a wireless communication device or other suitable means for performing the actions. For example, a wireless communication device, such as the UE 115 or UE 700, may utilize one or more components, such as the processor 702, the memory 704, the S-SSB/CSI-RS multiplexing module 708, the transceiver 710, the modem 712, and the one or more antennas 716, to execute aspects of method 1000. The method 1000 may employ similar mechanisms as in the networks 100 and 200 and the aspects and actions described with respect to FIGS. 2-6. As illustrated, the method 1000 includes a number of enumerated actions, but the method 900 may include additional actions before, after, and in between the enumerated actions. In some aspects, one or more of the enumerated actions may be omitted or performed in a different order.

At action 1010, the method 1000 includes a first UE (e.g., the UE 115 or the UE 700) receiving at least one channel state information reference signal (CSI-RS) from a second UE in a slot. In this regard, the first UE may receive the CSI-RS(s) in a PSSCH region (e.g., symbol indexes 2-13) of the slot to satisfy an occupied channel bandwidth (OCB) requirement. In some aspects, the first UE and/or the second UE may be a sidelink UE. The first UE may receive the CSI-RS(s) in a slot that is configured for S-SSB transmission. The first UE may multiplex reception of S-SSBs and CSI-RS(s) in the slot. The UE may multiplex the S-SSBs and CSI-RS(s) in the time and/or frequency domains. The first UE may receive a resource pool configuration from a BS (e.g., the BS 105 or the BS 800) that configures the time and/or frequency resources for the multiplexed S-SSBs and CSI-RSs. In this regard, the first UE may receive the resource pool configuration from the BS in a radio resource control (RRC) message, downlink control information (DCI), and/or other suitable communication.

The first UE may periodically and/or aperiodically receive the CSI-RS(s) from the second UE in the slot. For example, the UE may periodically receive the CSI-RS(s) in one or more slots. In some aspects, the first and second UEs may be configured as sidelink sync UEs. A sidelink sync UE may be configured to periodically receive S-SSBs or other communication signals from other sidelink UEs to enable synchronized communication between UEs. However, receiving S-SSBs in the slot alone may not satisfy the OCB requirement. In some aspects, the UE may receive a PSSCH and/or a PSCCH along with the S-SSBs to satisfy the OCB requirement. However, in some instances the second UE may not have data (e.g., TBs) to transmit in the same slot as the S-SSBs. Instead, the OCB may be satisfied based on the second UE transmitting, and the first UE receiving, the CSI-RS(s) along with the S-SSBs. In some instances, the first UE may periodically receive the CSI-RS(s) at a periodicity based on a S-SSB transmission periodicity. The first UE may receive S-SSBs according to a SSB transmission periodicity, for example, at about 40 ms, 80 ms, 160 ms, or any suitable periodicity. The first UE may receive the CSI-RS(s) at a periodicity equal to, a multiple of, and/or a factor of the S-SSB transmission periodicity.

In some aspects, the UE may receive the one or more CSI-RS(s) in the one or more slots via a contiguous range of frequencies. For example, the UE may the receive the one or more CSI-RS(s) via a plurality of frequency subchannels (e.g., contiguous resource blocks (RBs)), where each subchannel may carry one or more CSI-RS transmissions. The UE may determine the number of subchannels to receive the CSI-RS(s) in order to satisfy the OCB requirement. The UE may receive an indicator indicating a frequency range in which the UE may receive the CSI-RS(s). For example, the UE may receive an indicator from a BS (e.g., the BS 105 or the BS 800) indicating the frequency range in which the UE may receive the CSI-RS(s). Additionally or alternatively, the UE may determine the frequency range to receive the CSI-RS(s). For example, the first UE may determine the frequency range based on an identifier associated with the first UE (e.g., the destination ID) receiving the CSI-RS(s) and/or the second UE (e.g., the source ID) that transmits the CSI-RS(s). In some aspects, the UE may determine the frequency range to receive the CSI-RS(s) based on a hashing function associated with an index of the slot. For example, each slot may have an index value associated with the slot. The UE may perform a hashing function (e.g., a message digest (MD) hashing algorithm, a secure hashing algorithm, or other suitable hashing function) on the slot index to determine the frequency range for receiving the CSI-RS(s).

In some aspects, the UE may receive the CSI-RSs in the one or more slots via an interlaced range of frequencies. In some aspects, the UE may receive a resource pool configuration from a BS (e.g., the BS 105 or the BS 800). For example, a frequency-interlaced-based sidelink resource pool may include a plurality of frequency interlaces over a frequency range (e.g., a 20 MHz frequency band, a 40 MHz frequency band, an 80 MHz frequency band, a 160 MHz, frequency band, a licensed frequency band, an unlicensed frequency band, etc.), where each frequency interlace may include a plurality of resource blocks (RBs) distributed over the frequency range. For example, the plurality of RBs of a frequency interlace may be spaced apart from each other by one or more other RBs in the frequency range. The UE may select resources from the resource pool for receiving the CSI-RS(s). The UE may select a sidelink resource in the form of one or more frequency interlaces from the sidelink resource pool for sidelink communication. Sidelink transmissions may utilize a frequency-interlaced waveform to satisfy an OCB associated with the frequency range. In some aspects, the UE may determine a subset of the plurality of RBs in the frequency interlace that are non-overlapping with frequency resources used by the S-SSB transmission. For example, the UE may avoid selecting frequency interlaces in the lower portion of the BWP to avoid an overlap with the S-SSB transmission.

At action 1020, the method 1000 includes the first UE (e.g., the UE 115 or the UE 700) receiving at least one sidelink synchronization signal block (S-SSB) in the slot. In some aspects, an occupied channel bandwidth (OCB) associated with the slot may satisfy an OCB requirement based on the UE receiving the CSI-RS(s) and the S-SSBs in the slot. To satisfy an OCB requirement in a sidelink slot configured for an S-SSB transmission, the sidelink UE may receive an S-SSB transmission (e.g., action 1020 of the method 1000) multiplexed with one or more CSI-RSs (e.g., action 1010 of the method 1000). For example, the S-SSBs may be received in frequency resources located at a lower frequency portion of a SL bandwidth part (BWP) and the one or more CSI-RSs may be received in frequency resources located at a higher frequency portion of the sidelink BWP.

In some aspects, the UE may receive CSI-RS(s) in each slot in which the UE receives the S-SSBs to satisfy the OCB requirement. The UE may multiplex the CSI-RS(s) and the S-SSBs in the frequency domain. For example, the UE may receive the CSI-RS(s) in a first frequency range and receive the S-SSBs in a second frequency range. The second frequency range may be adjacent to the first frequency range. Receiving the CSI-RS(s) and S-SSBs in adjacent frequency ranges may satisfy an out of band emission constraint. The first frequency range may include one or more contiguous subchannels. In some aspects, the UE may receive the S-SSB transmissions aligned to the second frequency (e.g., a lowest frequency of the sidelink BWP). The UE may receive the CSI-RS(s) in the frequency adjacent to the lowest frequency in the sidelink BWP. In some aspects, the UE may periodically receive the CSI-RS(s) in each symbol of the slot (e.g., 14 symbols), a subset of symbols of the slot (e.g., 12 symbols), or any suitable number of symbols in the slot.

Additionally or alternatively, the UE may aperiodically receive the CSI-RS(s) to satisfy the OCB requirement. For example, the UE may aperiodically receive the CSI-RS(s) in between gaps (e.g., time gaps, frequency gaps) in periodic CSI-RSs. The UE may receive one or more SCI-2s in a PSSCH indicating that one or more aperiodic CSI-RS(s) will be transmitted by the second UE. The aperiodic CSI-RS(s) may be received in addition to the periodic CSI-RS transmissions or in lieu of the periodic CSI-RS transmissions. For example, the UE may determine that for any particular slot, the OCB requirement may not be satisfied based on the periodic CSI-RS transmissions alone. In this case, the UE may determine the number of aperiodic CSI-RS transmissions that are required to meet the OCB requirement. In some aspects, the number of aperiodic CSI-RSs transmitted by the second UE may be based on the first UE intended to receive the CSI-RS(s). The second UE may indicate in the one or more SCI-2s that aperiodic CSI-RS(s) will be transmitted. For example, the SCI-2s may indicate the resource elements in which the aperiodic CSI-RS(s) will be transmitted by the second UE and received by the first UE. In some aspects, the PSSCH carrying the SCI-2s may only carry the SCI-2s and may not carry TBs. In some aspects, the PSSCH carrying the SCI-2s may carry the SCI-2s and padding data (e.g., data not intended for a destination) in TBs. The first UE may receive an indicator from the second UE in the SCI-1 that indicates whether the PSSCH only carries the SCI-2. For example, the SCI-1 may include a code point(s) (e.g., a reserved beta offset code point) that indicates whether the PSSCH only carries the SCI-2 and does not carry TBs. In some aspects, the code point(s) may indicate whether data is carried by the PSSCH. In some aspects the code point(s) may indicate whether padding is carried by the PSSCH. The one or more SCI-2s may be received in any symbol of the slot. In some aspects, the one or more SCI-2s may be rate matched around the resource elements or the symbols carrying the aperiodic CSI-RS(s).

In some aspects, multiple UEs (e.g., sidelink sync UEs) may transmit S-SSBs using the same resources. In this case, each of the UEs transmitting the S-SSBs in the same resources may be assigned different frequency resources for transmitting the CSI-RS(s) in order for each of the UEs to satisfy the OCB requirement. The different frequency resources for transmitting the CSI-RS(s) may be determined based on a unique ID (e.g., source ID) of each UE. For example, the different frequency resources may be determined based on a hashing function (e.g., a message digest (MD) hashing algorithm, a secure hashing algorithm, or other suitable hashing function) of the UE source ID.

Additionally or alternatively, the first UE may receive one or more tracking reference signals (TRS) in addition to or instead of the CSI-RS(s) to satisfy the OCB requirement. The TRS may be a reference signal intended to assist the UEs with time and frequency tracking. The UE may multiplex S-SSBs and TRS(s) in the slot. The UE may multiplex the reception of S-SSBs and TRS(s) in the time and/or frequency domains. The first UE may receive a resource pool configuration from a BS (e.g., the BS 105 or the BS 800) that configures the time and/or frequency resources for the multiplexed reception of S-SSBs and TRS(s). The UE may periodically and/or aperiodically receive the TRS(s) to the second UE in the slot. The UE may receive the TRS(s) in one or more slots. The OCB may be satisfied based on the UE periodically and/or aperiodically receiving the TRS(s) in one or more slots along with the S-SSBs. The UE may periodically receive the TRS(s) at a periodicity based on a S-SSB transmission periodicity. The UE may receive S-SSBs according to an S-SSB transmission periodicity, for example, at about 40 ms, 80 ms, 160 ms, or any suitable periodicity. The UE may receive the TRS(s) at a periodicity equal to and/or a multiple of the S-SSB transmission periodicity.

In some aspects, the UE may receive one or more SCI-2s in a PSSCH indicating that one or more aperiodic TRS(s) will be receive. The aperiodic TRS(s) may be received in addition to or in lieu of the periodic TRS transmissions. For example, the UE may determine that for any particular slot, the OCB requirement may not be satisfied based on the periodic TRS alone. In this case, the UE may determine the number of aperiodic TRS receptions that are required to meet the OCB requirement. In some aspects, the number of aperiodic TRS(s) received by the UE may be based on the first UE intended to receive the TRS(s). The second UE may indicate in the one or more SCI-2s that aperiodic TRS(s) will be transmitted. For example, the SCI-2s may indicate the resource elements in which the aperiodic TRS(s) will be transmitted. The SCI-1 may schedule resources for the SCI-2 that triggers the aperiodic TRS transmissions. In some aspects, the PSSCH carrying the SCI-2s may only carry the SCI-2s and may not carry TBs. The first UE may receive an indicator from the second UE in the SCI-1 that indicates whether the PSSCH only carries the SCI-2. For example, the SCI-1 may include a code point(s) (e.g., a reserved beta offset code point) that indicates whether the PSSCH only carries the SCI-2. In some aspects, the code point(s) may indicate whether data is carried by the PSSCH. In some aspects the code point(s) may indicate whether padding is carried by the PSSCH. The one or more SCI-2s may be received in any symbol of the slot. In some aspects, the one or more SCI-2s may be rate matched around the resource elements or the symbols carrying the aperiodic TRS(s).

Further aspects of the present disclosure include the following:

Aspect 1 includes a method of wireless communication performed by a first sidelink user equipment (UE), the method comprising transmitting, to a second sidelink UE, at least one channel state information reference signal (CSI-RS) in a sidelink synchronization signal block (S-SSB) slot, wherein an occupied channel bandwidth (OCB) associated with the S-SSB slot satisfies a threshold based at least on the transmitting the at least one CSI-RS in the S-SSB slot.

Aspect 2 includes the method of aspect 1, further comprising periodically transmitting, to the second sidelink UE, one or more CSI-RSs in one or more S-SSB slots, wherein the one or more CSI-RSs includes the at least one CSI-RS; and an OCB associated with the one or more S-SSB slots satisfies the threshold based at least on the transmitting the one or more CSI-RSs in the one or more S-SSB slots.

Aspect 3 includes the method of any of aspects 1-2, wherein the periodically transmitting the one or more CSI-RSs in the one or more S-SSB slots comprises periodically transmitting the one or more CSI-RSs via a contiguous range of frequencies.

Aspect 4 includes the method of any of aspects 1-3, wherein the periodically transmitting the one or more CSI-RSs in the one or more S-SSB slots comprises periodically transmitting the one or more CSI-RSs via an interlaced range of frequencies.

Aspect 5 includes the method of any of aspects 1-4, further comprising transmitting, to the second sidelink UE, an indicator of the at least one CSI-RS in second stage sidelink control information (SCI-2) via a physical sidelink shared channel (PSSCH) in the S-SSB slot; and transmitting padding in the S-SSB slot via the PSSCH.

Aspect 6 includes the method of any of aspects 1-5, wherein the SCI-2 is rate matched around one or more resource elements carrying the at least one CSI-RS in the S-SSB slot.

Aspect 7 includes the method of any of aspects 1-6, wherein the transmitting, to the second sidelink UE, the at least one CSI-RS in the S-SSB slot comprises transmitting the at least one CSI-RS at a power level that maintains a constant power level across each symbol of the S-SSB slot.

Aspect 8 includes the method of any of aspects 1-7, selecting resources within the S-SSB slot, wherein the transmitting the at least one CSI-RS in the S-SSB slot comprises transmitting the at least one CSI-RS in the selected resources.

Aspect 9 includes the method of any of aspects 1-8, wherein the transmitting, to the second sidelink UE, the at least one CSI-RS in the S-SSB slot comprises transmitting the at least one CSI-RS in a first frequency range; and further comprising: transmitting at least one S-SSB in a second frequency range, wherein the second frequency range is adjacent to the first frequency range.

Aspect 10 includes the method of any of aspects 1-9, receiving an indicator indicating a frequency range, and wherein the transmitting, to the second sidelink UE, the at least one CSI-RS in the S-SSB slot comprises transmitting the at least one CSI-RS in the frequency range.

Aspect 11 includes the method of any of aspects 1-10, the transmitting, to the second sidelink UE, the at least one CSI-RS in the S-SSB slot comprises transmitting the at least one CSI-RS in a frequency range; and the frequency range is based on at least one of an identifier associated with the first sidelink UE or a hashing function associated with an index of the S-SSB slot.

Aspect 12 includes a method of wireless communication performed by a first sidelink user equipment (UE), the method comprising receiving, from a second sidelink UE, at least one channel state information reference signal (CSI-RS) in a sidelink synchronization signal block (S-SSB) slot, wherein an occupied channel bandwidth (OCB) associated with the S-SSB slot satisfies a threshold based at least on the receiving the at least one CSI-RS in the S-SSB slot.

Aspect 13 includes the method of aspect 12, further comprising periodically receiving, from the second sidelink UE, one or more CSI-RSs in one or more S-SSB slots wherein the one or more CSI-RSs includes the at least one CSI-RS, wherein an OCB associated with the one or more S-SSB slots satisfies the threshold based at least on the receiving the one or more CSI-RSs in one or more S-SSB slots.

Aspect 14 includes the method of any of aspects 12-13, further comprising receiving, from the second sidelink UE, an indicator in second stage sidelink control information (SCI-2) via a physical sidelink shared channel (PSSCH) in the S-SSB slot; and receiving padding in the S-SSB slot via the PSSCH, wherein the receiving, from the second sidelink UE, the at least one CSI-RS in the S-SSB slot is based on the indicator.

Aspect 15 includes the method of any of aspects 12-14, wherein the receiving, from the second sidelink UE, the at least one CSI-RS in the S-SSB slot comprises receiving the at least one CSI-RS in a frequency range; and the frequency range is based on at least one of an identifier associated with the first sidelink UE or a hashing function associated with an index of the S-SSB slot.

Aspect 16 includes a non-transitory computer-readable medium storing one or more instructions for wireless communication, the one or more instructions comprising one or more instructions that, when executed by one or more processors of a first sidelink user equipment, cause the one or more processors to perform any one of aspects 1-11.

Aspect 17 includes a non-transitory computer-readable medium storing one or more instructions for wireless communication, the one or more instructions comprising one or more instructions that, when executed by one or more processors of a first sidelink user equipment, cause the one or more processors to perform any one of aspects 12-15.

Aspect 18 includes a first sidelink user equipment (UE) comprising one or more means to perform any one or more of aspects 1-11.

Aspect 19 includes a first sidelink user equipment (UE) comprising one or more means to perform any one or more of aspects 12-15.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a first sidelink user equipment (UE), the method comprising:
    transmitting, to a second sidelink UE, at least one channel state information reference signal (CSI-RS) in a sidelink synchronization signal block (S-SSB) slot, wherein an occupied channel bandwidth (OCB) associated with the S-SSB slot satisfies a threshold based at least on the transmitting the at least one CSI-RS in the S-SSB slot; and
    transmitting, to the second sidelink UE, an indicator of the at least one CSI-RS in second stage sidelink control information (SCI-2) via a physical sidelink shared channel (PSSCH) in the S-SSB slot.

2. The method of claim 1, further comprising:
    periodically transmitting, to the second sidelink UE, one or more CSI-RSs in one or more S-SSB slots, wherein:
        the one or more CSI-RSs includes the at least one CSI-RS; and
        an OCB associated with the one or more S-SSB slots satisfies the threshold based at least on the transmitting the one or more CSI-RSs in the one or more S-SSB slots.

3. The method of claim 2, wherein the periodically transmitting the one or more CSI-RSs in the one or more S-SSB slots comprises periodically transmitting the one or more CSI-RSs via a contiguous range of frequencies.

4. The method of claim 2, wherein the periodically transmitting the one or more CSI-RSs in the one or more S-SSB slots comprises periodically transmitting the one or more CSI-RSs via an interlaced range of frequencies.

5. The method of claim 1, further comprising:
    transmitting padding in the S-SSB slot via the PSSCH.

6. The method of claim 5, wherein the SCI-2 is rate matched around one or more resource elements carrying the at least one CSI-RS in the S-SSB slot.

7. The method of claim 1, wherein the transmitting, to the second sidelink UE, the at least one CSI-RS in the S-SSB slot comprises transmitting the at least one CSI-RS at a power level that maintains a constant power level across each symbol of the S-SSB slot.

8. The method of claim 1, further comprising:
selecting resources within the S-SSB slot, wherein:
the transmitting the at least one CSI-RS in the S-SSB slot comprises transmitting the at least one CSI-RS in the selected resources.

9. The method of claim 1, wherein:
the transmitting, to the second sidelink UE, the at least one CSI-RS in the S-SSB slot comprises transmitting the at least one CSI-RS in a first frequency range; and
further comprising:
transmitting at least one S-SSB in a second frequency range, wherein the second frequency range is adjacent to the first frequency range.

10. The method of claim 1, further comprising:
receiving an indicator indicating a frequency range, and wherein the transmitting, to the second sidelink UE, the at least one CSI-RS in the S-SSB slot comprises transmitting the at least one CSI-RS in the frequency range.

11. The method of claim 1, wherein:
the transmitting, to the second sidelink UE, the at least one CSI-RS in the S-SSB slot comprises transmitting the at least one CSI-RS in a frequency range; and
the frequency range is based on at least one of an identifier associated with the first sidelink UE or a hashing function associated with an index of the S-SSB slot.

12. A method of wireless communication performed by a first sidelink user equipment (UE), the method comprising:
receiving, from a second sidelink UE, at least one channel state information reference signal (CSI-RS) in a sidelink synchronization signal block (S-SSB) slot, wherein an occupied channel bandwidth (OCB) associated with the S-SSB slot satisfies a threshold based at least on the receiving the at least one CSI-RS in the S-SSB slot; and
receiving, from the second sidelink UE, an indicator of the at least one CSI-RS in second stage sidelink control information (SCI-2) via a physical sidelink shared channel (PSSCH) in the S-SSB slot.

13. The method of claim 12, further comprising:
periodically receiving, from the second sidelink UE, one or more CSI-RSs in one or more S-SSB slots wherein the one or more CSI-RSs includes the at least one CSI-RS, wherein an OCB associated with the one or more S-SSB slots satisfies the threshold based at least on the receiving the one or more CSI-RSs in the one or more S-SSB slots.

14. The method of claim 12, further comprising: receiving padding in the S-SSB slot via the PSSCH.

15. The method of claim 12, wherein:
the receiving, from the second sidelink UE, the at least one CSI-RS in the S-SSB slot comprises receiving the at least one CSI-RS in a frequency range; and
the frequency range is based on at least one of an identifier associated with the first sidelink UE or a hashing function associated with an index of the S-SSB slot.

16. A first sidelink user equipment (UE) comprising:
a memory;
a transceiver; and
at least one processor coupled to the memory and the transceiver, wherein the first sidelink UE is configured to:
transmit, to a second sidelink UE, at least one channel state information reference signal (CSI-RS) in a sidelink synchronization signal block (S-SSB) slot, wherein an occupied channel bandwidth (OCB) associated with the S-SSB slot satisfies a threshold based at least on the transmitting the at least one CSI-RS in the S-SSB slot; and
transmit, to the second sidelink UE, an indicator of the at least one CSI-RS in second stage sidelink control information (SCI-2) via a physical sidelink shared channel (PSSCH) in the S-SSB slot.

17. The first sidelink UE of claim 16, wherein the first sidelink UE is further configured to:
periodically transmit, to the second sidelink UE, one or more CSI-RSs in one or more S-SSB slots, wherein the one or more CSI-RSs includes the at least one CSI-RS, wherein an OCB associated with the one or more S-SSB slots satisfies the threshold based at least on the transmitting the one or more CSI-RSs in the one or more S-SSB slots.

18. The first sidelink UE of claim 17, wherein the first sidelink UE is further configured to:
periodically transmit the one or more CSI-RSs via a contiguous range of frequencies.

19. The first sidelink UE of claim 17, wherein the first sidelink UE is further configured to:
periodically transmit the one or more CSI-RSs via an interlaced range of frequencies.

20. The first sidelink UE of claim 16, wherein the first sidelink UE is further configured to:
transmit padding in the S-SSB slot via the PSSCH.

21. The first sidelink UE of claim 20, wherein the SCI-2 is rate matched around one or more resource elements carrying the at least one CSI-RS in the S-SSB slot.

22. The first sidelink UE of claim 16, wherein the first sidelink UE is further configured to:
transmit the at least one CSI-RS at a power level that maintains a constant power level across each symbol of the S-SSB slot.

23. The first sidelink UE of claim 16, wherein the first sidelink UE is further configured to:
select resources within the S-SSB slot; and
transmit the at least one CSI-RS in the selected resources.

24. The first sidelink UE of claim 16, wherein the first sidelink UE is further configured to:
transmit the at least one CSI-RS in a first frequency range; and
transmit at least one S-SSB in a second frequency range, wherein the second frequency range is adjacent to the first frequency range.

25. The first sidelink UE of claim 16, wherein the first sidelink UE is further configured to:
receive an indicator indicating a frequency range; and
transmit the at least one CSI-RS in the frequency range.

26. The first sidelink UE of claim 16, wherein the first sidelink UE is further configured to:
transmit the at least one CSI-RS in a frequency range, wherein:
the frequency range is based on at least one of an identifier associated with the second sidelink UE or a hashing function associated with an index of the S-SSB slot.

27. A first sidelink user equipment (UE) comprising:
a memory;

a transceiver; and at least one processor coupled to the memory and the transceiver, wherein the first sidelink UE is configured to:

receive, from a second sidelink UE, at least one channel state information reference signal (CSI-RS) in a sidelink synchronization signal block (S-SSB) slot, wherein an occupied channel bandwidth (OCB) associated with the S-SSB slot satisfies a threshold based at least on the receiving the at least one CSI-RS in the S-SSB slot, and receive, from the second sidelink UE, an indicator of the at least one CSI-RS in second stage sidelink control information (SCI-2) via a physical sidelink shared channel (PSSCH) in the S-SSB slot.

28. The first sidelink UE of claim 27, wherein the first sidelink UE is further configured to:

periodically receive, from the second sidelink UE, one or more CSI-RSs in one or more S-SSB slots wherein the one or more CSI-RSs includes the at least one CSI-RS, wherein an OCB associated with the one or more S-SSB slots satisfies the threshold based at least on the receiving the one or more CSI-RSs in the one or more S-SSB slots.

29. The first sidelink UE of claim 27, wherein the first sidelink UE is further configured to:

receive padding in the S-SSB slot via the PSSCH.

30. The first sidelink UE of claim 27, wherein the first sidelink UE is further configured to:

receive the at least one CSI-RS in a frequency range, wherein:

the frequency range is based on at least one of an identifier associated with the second sidelink UE or a hashing function associated with an index of the S-SSB slot.

* * * * *